US007484103B2

(12) United States Patent
Woo et al.

(10) Patent No.: US 7,484,103 B2
(45) Date of Patent: Jan. 27, 2009

(54) METHOD AND SYSTEM FOR THE INFORMATION PROTECTION OF DIGITAL CONTENT

(76) Inventors: Je-Hak Woo, 101-411, Pooreunmauel Apt., Irwon-dong, Kangnam-gu, 165-942 Seoul (KR); Hwan-Chul Lee, 35-311, Hanyang2-cha Apt., 932, Dongchun2(i)-dong, Yeonsu-gu, 406-802 Incheon (KR); Sang-Young Cho, 104-1504, Poongsan Apt., 464-2, Wangsan-ri, Mohyeon-myeon, Yongin-si, 499-854 Gyeonggi-do (KR); Seong-Ho Jeong, 126-1202, Phamspring Apt., Adong-dong, Paju-si, 413-720 Gyeonggi-do (KR); Young-Soo Ha, Fl. 3, 408-130Gongneung 2(i)-dong, Nowon-gu, 139-804, Seoul (KR); Seog-Kyoon Shin, 103-503, Byeoksanlivepark Apt., Mia-dong, Gangbuk-gu, 140-100 Seoul (KR); Seong-Il Kim, 404-308, Samik Apt., Gongneung 3 (sam)-dong, Nowon-gu, 139-801, Seoul (KR)

( * ) Notice: Subject to any disclaimer, the term of this patent is extended or adjusted under 35 U.S.C. 154(b) by 885 days.

(21) Appl. No.: 10/501,254

(22) PCT Filed: Jan. 10, 2003

(86) PCT No.: PCT/KR03/00052
§ 371 (c)(1),
(2), (4) Date: Jul. 8, 2004

(87) PCT Pub. No.: WO03/058485

PCT Pub. Date: Jul. 17, 2003

(65) Prior Publication Data
US 2005/0086501 A1 Apr. 21, 2005

(30) Foreign Application Priority Data
Jan. 12, 2002 (KR) .................... 10-2002-0001916
Nov. 26, 2002 (KR) .................... 10-2002-0073773

(51) Int. Cl.
*G06F 11/30* (2006.01)
(52) U.S. Cl. .................... 713/189; 713/151; 713/152; 713/167; 713/193; 726/26; 726/27; 726/30; 380/201; 709/223; 709/225
(58) Field of Classification Search ................ 713/167, 713/189, 193, 151, 152; 380/201; 726/26, 726/27, 30; 709/223, 225
See application file for complete search history.

(56) References Cited

U.S. PATENT DOCUMENTS
6,226,618 B1 * 5/2001 Downs et al. .............. 705/1
(Continued)

FOREIGN PATENT DOCUMENTS
KR 10-2001-0034000 4/2001
(Continued)

*Primary Examiner*—KimYen Vu
*Assistant Examiner*—Beemnet W Dada
(74) *Attorney, Agent, or Firm*—Schmeiser, Olsen & Watts, LLP

(57) ABSTRACT

The present invention relates to the information protection of digital content transferred by streaming and download service through wire or wireless Internet network. The information protection system in this invention suggests a drastic prevention method of copyrights infringement such as illegal copy and unauthorized distribution of digital content, by using of the encryption, decryption, distribution, and authentication technologies. This invention suggests the control technology of general viewer program, not the specific viewer program for information protection, using a network filter driver for streaming and file system filter driver for download service. The main function of network and file system filter driver is the filtering operation such as a hooking, changing, decrypting, and restoring of message and data packet, and transferring to the viewer program. The main idea and technology of this invention suggest higher secure and efficient digital information protection system for live/VOD/HTTP streaming and download service.

30 Claims, 28 Drawing Sheets

U.S. PATENT DOCUMENTS

| | | | |
|---|---|---|---|
| 6,389,402 B1 * | 5/2002 | Ginter et al. | 705/51 |
| 6,816,596 B1 * | 11/2004 | Peinado et al. | 380/277 |
| 7,073,199 B1 * | 7/2006 | Raley | 726/26 |
| 2002/0090086 A1 * | 7/2002 | Van Rijnsoever | 380/207 |

FOREIGN PATENT DOCUMENTS

| | | |
|---|---|---|
| KR | 10-1001-0050381 | 6/2001 |
| KR | 10-2001-0079162 | 8/2001 |
| KR | 10-2001-0109271 | 12/2001 |
| KR | 10-2001-0114188 | 12/2001 |
| KR | 10-2002-0029657 | 4/2002 |
| KR | 10-2002-0075568 | 10/2002 |
| KR | 10-0400947 | 9/2003 |

* cited by examiner

FIG. 19

| Version number | Content URI length | Content type length |
|---|---|---|
| Content URI ||| 
| Content type |||
| Header length || Data length |
| Encryption Method |||
| Rights Issuer URL |||
| Content Name |||
| Content Description |||
| Content Vendor |||
| Icon URI |||
| Digital Signature || Content Server URL |

FIG. 20

| License seperator |
| :---: |
| License version |
| Authentication success flag |
| Arbitrary message |
| License flag |
| Start date |
| End date |
| Total count |
| Current count |
| Total print |
| Total PC |
| Current PC |
| Total Kc index |
| Current Kc index |
| Kc |
| Hardware information collection flag |
| Hardware information collection URL |

FIG. 23

METHOD AND SYSTEM FOR THE INFORMATION PROTECTION OF DIGITAL CONTENT

FIELD OF THE INVENTION

The present invention relates generally to the information protection of digital content stored in a digital devices such as computer system, PDA, set-top box, cellular phone, etc. The purpose of this invention supposes a method and system, computer program, to facilitate the information protection of digital content transferred by streaming and download service through wire or wireless internet network. The digital content in this invention is a digital file including such as movie, sound, image, software, game, online education, etc. The present invention suggests a new content service of streaming and download method to support a encryption, distribution, and decryption of content and to allow a proper content usage, without the additional generation of network traffic or server overload. In addition, the information protection system in this invention suggests a drastic prevention method of copyrights infringement such as illegal copy and unauthorized distribution of digital content, by using of the encryption, decryption, distribution, and authentication technologies. One of outstanding features of this information protection system is the control technology of general viewer program, not the specific viewer program for information protection, using a network filter driver for streaming and file system filter driver for download service. The main function of network and file system filter driver is the filtering operation such as a hooking, changing, decrypting, and restoring of message and data packet, and transferring to the viewer program. In conclusion, the main idea and technology of this invention suggest higher secure and efficient digital information protection system for live/VOD/HTTP streaming and download service.

BACKGROUND OF THE INVENTION

Recently various documents and contents are generated and distributed as a digital content readable by computer, according to the rapid development of computer, internet, and storage devices. Unfortunately, the digital content have fatal problem that is too easy to copy and distribute illegally the original one with same quality. Though there are a lot of time, effort, and capital invested into making the valuable digital content, it is difficult to expect for the development of the digital content industry without any proper and legal effort to protect the copyrights.

The Digital Rights Management(DRM) technology moves into the limelight as the core technology enabling to block thoroughly illegal copy and unauthorized distribution of digital content and realize the profit from digital content service business. Therefore the whole global countries and companies are very interested in the copyright protection of digital content just like the examples of Napster.com in the U.S., Soribada.com in the South Korea and Warez sites for the exchange of MP3 files or illegal movie files, which is stirred with the copyright conflict. DRM system is pivotal technology to build up the copyright protection and proper distribution system of digital content, which utilized by the methods such as online and offline digital networks.

If the DRM system is applied to the content service, the possibility of copyright infringement is abruptly decreased because of the content encryption. The customer who wants to view the digital content, therefore, must pay the proper content fee, which is very important for the enlargement of digital content industry. In addition, DRM is not only the copyright protection technology but also the potential technology for the new selling and distribution of digital content, for an example of super-distribution.

DRM system may be divided mainly into three categories of internet DRM for PC(Personal computer), mobile DRM for cellular phone and PDA(Personal Digital Assistants), and set-top box DRM for Home VOD(Video On Demand) service, according to the application field. Also DRM system may be divided into DRM for document content security and for multimedia content security, according to the application object. In detail, DRM system for multimedia content security may be distinguished as download support or VOD/live streaming support according to the technological difficulty.

The international companies for DRM solution are Intertrust which first started internationally DRM technology development in 1990, Microsoft, IBM, Contentguard, Realnetworks, Lockstream, Digimarc, Divxnetworks, Entriq, Sealedmedia, Sony, Nec, etc. In Korea, there are about over 30 venture companies developing ardently the technology and competing for commercialization of the DRM system.

Although there are many positive expectations in the market, the commercialization of DRM system is very slowly proceeding. It is mainly due to the technological weakness, according to the analysis of the released DRM solutions up to now.

For examples, most of DRM solutions compel an end user to endure the installation of a specific viewer program for DRM, and there are limitations of the content formats supported and low standardization. First of all, the specific viewer program for DRM gives end user a reluctance of DRM applied and has a restriction of file format supported. Since the specific viewer program is continuously needed to be developed and upgraded, it is main fault for DRM Company and end user.

In addition, most of DRM system can support the content service not by streaming but download up to now. Though only a few DRM companies such as Microsoft and Realnetworks have developed the DRM for streaming, no DRM solution for live streaming is released until now.

Microsoft has expanded its own market supremacy to distribute DRM SDK(Software Development Kit) what is called WMRM(Windows Media Rights Manager) for free because the company assumed that the DRM market is not fully expanded. Even though the effort of the Microsoft, the Microsoft's DRM solution has the weak point that its DRM technology is only applicable to its own file formats.

The streaming technology, which is the process of playing a digital file while it is still downloading and lets a user view and hear digitalized content such as video, sound and animation, is now popular for the content service. Unlike download, streaming technology is not needed to receive the all contents data from external network server and it plays repeatedly a part of content data downloaded. Streaming is very useful data transmission technology for the prevention of copyright infringement, content service of very large file size, and removal of inconvenient waiting for download. By using streaming technology, the content data transferred from external network is not saved at HDD of client system but temporarily saved and played on RAM(Random Access Memory) for content service. Streaming may be divided into VOD streaming and live streaming. The content of VOD streaming must be in advance manufactured and be deployed on the content server and may be transferred to client system dependent on the user's request. In live streaming, the content of online performance, news, and sports game must be transferred in real-time to client system. In the case of HTTP streaming, a part of digital content is played continuously and saved simultaneously at HDD during downloading.

But it is proved that streaming is no more secure content service, after Hoonnet Inc. in Korea releases the "Hinet Recorder" for the recording of the streaming data. Hinet Recorder can record the streaming content with same quality of original content and illegal copy products are very spread through Warez sites. It is proven that streaming technology is very weak to illegal copy.

In this invention, client system is meant as general information processing system such as PC, Notebook, PDA, cellular phone, set-top box, digital TV, Telematics device, etc. The general information processing system is composed of a CPU, volatile storage device such as memory, non-volatile storage device such as hard disk drive, and input/output device such as keyboard or monitor, etc. and is connected with wire or wireless communication devices for internal and external communication, respectively. In addition, the information processing system is composed of hardware and software, the device driver is an interface software to activate the specific devices, which play a role of connecting with device.

There are various device drivers in the information processing system which may be located like layer stacks. One of the representative device drivers is a file system device driver that is responsible for the control and management of storage device such as HDD and files and directories. The network filter driver is a famous driver for the control and management of network device for external communication. There are a lot of device drivers for the control of each device, such as virtual memory, CPU, process management, multitasking, printer, keyboard, monitor, etc. The filter driver can be programmed for the specific function and located properly like filter in the layer stack of device drivers.

Recently Teruten Inc. proposes the patent of "The security system for the secure transmission and execution of digital data"(Korea Patent Pending No. 10-2001-34583) for DRM system without a specific viewer program. The main component of above patent pending is composed of specific storage region, file system filter driver, and file filter controller. Since the file system filter driver play role in the filtering operation, only approved application program can approach the specific storage region at HDD. The above patent pending has a few weaknesses. The file system filter driver is well known to control the application program and encrypt/decrypt a file data. Because the DRM system in above technique needs to an additional establishment of storage region, in which a decrypted file is stored, for the special management, there may be some dangerous for data security. Additionally, there is an inconvenience by registration and management of all approved programs into file filter driver and detailed explanation for technology development is missing in above invention. The focus of above invention is mainly constricted to the DRM system proposal for higher interoperability between various DRM solutions manufactured by different companies.

Also Teruten Inc. proposed another patent pending of "A system and method for protection of digital data executed by stream method"(Korea Patent Pending No. 10-2001-50151). Although the title of patent is expressed as "stream method", it could not be applied to content service by general streaming technology because of filter system filter driver. Since the content must be saved in the HDD and transferred to file filter driver, the DRM system proposed in this invention could not support the content service by VOD or live streaming.

On the other hand, there is a powerful invention of data security related with file filter driver proposed by Infraworks Inc. The title of patent is "System and method for providing data security" (PCT Pending No. WO 0125870/Korea Patent Pending No. 10-2001-7006901). But the core technology is related file filter driver of controlling the storage device such as HDD, which is composed of packager and receiver based on function of file filter driver. Since this technology is constricted to file security by download method, it could not be applied to the streaming service by temporarily save and usage on RAM.

Different with prior art, Coretrust Inc. proposed a unique invention of DRM technology whose title is "A method and system for information protection for digital contents" (Korea Patent Pending No. 10-2002-1916). In this invention, it is supposed to control the general application program without a specific viewer program using the control of file system filter driver. According to this technology, a useful and creative DRM system can be manufactured for content service of download and HTTP streaming.

Coretrust also proposed another patent whose title is "A system and method of the information protection for multimedia streaming content, and recorded medium thereof" (Korea Patent Pending No. 10-2002-73773). In this invention, a new DRM system without specific viewer program for VOD and live streaming is supposed by using of network filter driver. Network filter driver in this invention play an important role of filtering operation of encrypted content data received by streaming method.

DETAILED DESCRIPTION OF THE INVENTION

The main purpose of this invention is proposed to concrete explanation of a new DRM system, which can be efficiently applied to multimedia content service by VOD/live/HTTP streaming and download method. In addition, present technology is related with a method, system, and computer program for a creative DRM solution without copyright infringement, capable of content service that is delivered by streaming and download.

Another purpose of this invention provides a new method and system of DRM, which protect copyright safety without increase of additional server or occurrence of network traffic, using the same streaming method or protocol, which is not changed before or after DRM adoption.

Additionally another purpose of this invention is that encrypted content package will be delivered by streaming and download method to client system and can be viewed or played by existent viewer and player program without using specific viewer program for DRM. This DRM system as another advantage can support easily various file format and be adapted to a new application program.

Another purpose of this invention presents smooth decryption of encrypted content data and safe protection of copyright method. Encrypted content package that is delivered by streaming and download method may be filtered by network filter driver and file filter driver, such as a hooking, changing, and decrypting of message and packet between application program and device driver in kernel mode, and transferring to the application program.

Another purpose of this invention presents a new DRM system which can support live streaming first in the world and can makes encryption and decryption of multimedia contents data efficiently.

To achieve technological assignment such as preceding descriptions, this invention of new DRM system needs to have a network filter driver for VOD and live streaming and file system filter driver for HTTP streaming and download. The common description of streaming in this invention is a transmission technology in which the content data may be played by part without entire storing of content in the client system. Streaming technology is divided into VOD, live, and HTTP streaming. Besides the download technology means that content data may be played after entire downloading and save in storage device of the client system. This invention presents a method, system and computer program product of DRM to support a content service by streaming and download method efficiently. Network and file system filter drivers may play an important role of filtering operation that is composed of a hooking, changing, decrypting and restoring of message and data packet between application program and device drivers, and transferring of decrypted content data to application program.

More detailed characteristics of the system for the information protection of multimedia content according to this invention is as below, a multimedia contents protecting system for preventing multimedia contents, which are sent to an application program running on a client system, from leaking without permission through the use of an information providing system and the client system, the information providing system and the client system each having a Central Processing Unit (CPU), a volatile storage (memory), a non-volatile storage (hard disk) and an input/output device (keyboard, monitor, etc.), and being connected to each other through wired or wireless internal communication means or means for communicating with an external network, comprising:

the information providing system comprising, encryption means (110) for encrypting original contents using one or more encryption keys and generating a content package (121), provision means (120) for holding the encrypted content package (121) and providing the encrypted content package (121) to users on line, and a Digital Rights Management (DRM) server (130) for managing generation of the encryption keys and performing various authentication operations; and the client system comprising, filtering means positioned between the application program and a device driver on a lower layer for hooking and converting a messages and a data packet, decrypting an encrypted data packet and sending the decrypted data packet to the application program, control means for starting and terminating the application program and controlling the filtering means, and an application program (144) for receiving the contents from the filtering means and playing the contents.

In a preferred embodiment, the encryption means (110) is a content packager (112) that receives the encryption keys generated by the DRM server (130) and encrypts the contents.

In a preferred embodiment, the provision means (120) is a content server (122) to which the content package (121) encrypted by the encryption means (110) is uploaded, and the content server (122) is a streaming server (122a) that provides actual streaming, a Web server (122b) that allows encrypted contents to be selected or provides download service, or a File Transfer Protocol (FTP) server.

In a preferred embodiment, the DRM server (130) comprises:

a DRM server Database (DB) (131) for storing various content information of the DRM server (130), the encryption keys, user information and application program information;

a DRM server component (132) for managing generation of the encryption keys and issuance of licenses;

a DRM license issuer (133) for issuing an encrypted license package in response to a request of the DRM controller (141); and a DRM administrator (134) for performing various setting and administration.

In a preferred embodiment, the multimedia contents protecting system further comprises connecting means for enabling a connection to a billing server (150) or payment gateway server (160) to bill users for pay services.

In a preferred embodiment, the filtering means performs a filtering operation in kernel mode in response to an instruction of the control means, and is a network filter driver (404), or file filter driver (407) that converts and restores a file offset and a file length message requested by the application program (144) from the file system (405).

In a preferred embodiment, the control means is a DRM controller (141) that is automatically activated to initiate the application program (144) when a user selects contents in a Web page in the case of a streaming manner or issues a command to open contents downloaded to a hard disk in the case of a downloading manner, accesses the DRM server (130), allows the contents and the user to be authenticated and receives the license package (143) including one or more decryption keys, terminates the filtering operation depending on terminating of the application program (144), and controls the filtering means.

In a preferred embodiment, the application program (144) is not a dedicated viewer program having a function of decrypting the content package, but a general application program capable of playing contents of a content package form.

In a preferred embodiment, the client system further comprises storage means that revises or edits contents that the application program (144) have decrypted and read, and encrypts and stores the revised or edited contents, and the network filter driver (404) or file filter driver (407) further comprises an encryption means.

In a preferred embodiment, the network filter driver (404) or file filter driver (407) is situated on an uppermost one of device driver layers in a direction toward the application program (144).

In a preferred embodiment, the network filter driver (404) uses a Transmission Control Protocol (TCP), or User Diagram Protocol (UDP) additionally having a function of correcting received data.

In a preferred embodiment, continuous content packets are sent and played in the case of a streaming manner, further comprising storage means for allowing content packets to be downloaded to the client system (140) and to be stored therein.

In a preferred embodiment, the multimedia contents are sent in one of a Video On Demand (VOD) streaming manner, a real-time live streaming manner, a complete downloading manner and a Hyper Text Transfer Protocol (HTTP) manner, or off line in a storage medium, such as Compact Disk (CD) or Digital Versatile Disk (DVD).

In a preferred embodiment, the multimedia contents protecting system further comprises a network filter driver disposed upstream of a network driver of an encoding system for performing hooking and encryption before the real-time live contents are sent to an external streaming server in the case of a real-time live streaming manner in which the sending of the multimedia contents are performed through a multimedia receiving device and the encoding system.

In a preferred embodiment, encrypted content package (142) comprises at least a data object portion that are encrypted contents (142a) and a header object portion that are non-encrypted Meta data (142b).

In a preferred embodiment, a DRM package header of the encrypted content package (142) is recorded in the header object of a multimedia content file form.

In a preferred embodiment, the DRM package header includes a version number, a content Uniform Resource Identifier (URI) length, a content type length, a content URI, a content type, a header length, a data length, an encryption method, a rights issuer Uniform Resource Identifier (URL), a content name, a content description, a content vendor, an icon URI, a digital signature, and a content server URL.

In a preferred embodiment, the data object that is the encrypted contents (142a) is fully encrypted or partially encrypted in one or more predetermined frames.

In a preferred embodiment, the client system further comprises storage means for storing the encrypted content package.

In a preferred embodiment, the encrypted license package (143) sent to the client system in response to a request of the user for authentication comprises:

a decryption key (143a) for performing decryption; and usage rights (143b) including at least a count of use and a period of use of the contents and terminal restriction information.

In a preferred embodiment, a multimedia contents protecting method of preventing multimedia contents, which are sent to an application program running on a client system, from leaking without permission through the use of an information providing system and the client system, the information providing system and the client system each having a CPU, a volatile storage (memory), a non-volatile storage (hard disk) and an input/output device (keyboard, monitor, etc.), and being connected to each other through wired or wireless internal communication means or means for communicating with an external network, comprises:

the encrypting and uploading step of converting original contents (111) into an encrypted content package (121) using one or more encryption keys of a DRM server and uploading the encrypted content package (121) to a content server (122);

the initiating and connecting step of connecting the client system to the content server (122) and initiating streaming or downloading service by selecting contents in a Web server (122b) or FTP server;

the decrypting and playing step of decrypting and playing content data through an application program (144) in response to a signal from a player during sending in the case of a streaming manner, or after downloading in the case of a downloading manner; and the terminating step of terminating an operation of the application program (144) and a filtering operation and disconnecting the client system from the content server (122) in the case of a streaming manner when a DRM controller (141) detects a termination command of the application program (144).

In a preferred embodiment, the encrypting and uploading step comprises:

the step (S21 and S22) of the content packager (112) requesting and obtaining an authentication from the DRM server (130);

the step (S23 and S24) of the content packager (112) requesting and obtaining one or more encryption keys from the DRM server (130);

the step of the content packager (112) encrypting contents using the encryption keys;

the step (S25 and S26) of the content packager (112) requesting and obtaining an authentication from the content server (122); and the step (S27) of the content packager (112) sending the encrypted content package (121) to the content server (112).

In a preferred embodiment, the initiating and connecting step comprises:

the step (S31) of the Web server (122b) or FTP server sending content identification information and user identification information to the DRM controller (141) if the application program (144) is commanded to retrieve contents after downloading of the contents in the case of a downloading manner, or if contents are selected on a Web page in the case of a streaming manner;

the step (S32 and S33) of the DRM controller (141) requesting content and user authentication from the DRM server (130) and receiving license authentication including a decryption key and user authority information;

the step (S34) of the DRM controller (141) sending to the application program (144) an URL of the content server (122) in the case of a streaming manner, a position of a hard disk where the contents are stored in the case of a complete downloading manner, and both the URL of the content server (122) and the position of the hard disk in the case of a HTTP streaming manner, after initiating the application program (144); and the step (S35) of the DRM controller (141) requesting content data from the content server (122) in the case of a streaming manner, from the file system in the case of a downloading manner, and from both the content server (122) and the file system in the case of a HTTP streaming manner.

In a preferred embodiment, the multimedia contents protecting method further comprises:

the connection preparing step of performing examination of a handler and registration of a process after the application program (144) is initiated; and the connecting step of performing next registration of a process and ascertainment and storing of a remote port.

In a preferred embodiment, the connection preparing step comprises:

the step of starting and temporarily stopping the application program (144);

the step of the DRM controller (141) determining whether the handler is zero by hooking a message between the application program (144) and the network driver or file system using filtering means;

the step of deleting an address handle to cancel the connection and sending a message to the network driver or file system if the handler is zero, and determining whether a process is registered in the filtering means if the handler is not zero;

the step of sending a message to the network driver or file system if the process is not registered in the filtering means, and registering an address handle, setting a my event handler, storing a local port and sending a changed message to the network driver or file system if the process is registered in the filtering means; and the step of the application program (144) receiving a ready message from the network driver or file system through the sending of the message.

In a preferred embodiment, the connecting step comprises:

the step of the filtering means hooking a message between the application program (144) and the network driver or file system and determining whether the process is registered in the filtering means;

the step of sending the message the network driver or file system if the process is not registered in the filtering means, and determining whether a remote port has a predetermined number if the process is registered in the filtering means; and the step of sending the message to the network driver or file system if the remote port does not have the predetermined number, and sending the message to the network driver or file system after storing a remote port number in an address handle structure having a local port connected to the remote port if the remote port has the predetermined number.

In a preferred embodiment, the encrypting and playing step comprises:

the step (901) of a storage in the case of downloading, and the content server (122) in the case of streaming periodically sending a data packet to the application program (144), along with control information;

the step (403) of hooking the data packet using the filtering means;

the step (902) of determining whether a remote port has a predetermined number in a state in which the my event handler is activated;

the step of sending the data packet to the application program (144) if the remote port does not have the predetermined number, and decrypting the data packet and sending the decrypted data packet to the application program (144) if the remote port has the predetermined number; and the step of playing the data packet by repeating the above steps.

In a preferred embodiment, the multimedia contents protecting method further comprises:

the step of determining whether the data packet is stored in the hard disk before being decrypted (905); and the step of decrypting the data packet if the data packet is not stored in the hard disk, and decrypting the data packet after being stored in the hard disk if the data packet is not stored in the hard disk.

In a preferred embodiment, the terminating step comprises:

the step of the DRM controller (141) detecting a termination message of the application program (144) every cycle in which the content data packet is decrypted and played; and the step of returning to the decrypting and playing step if the termination message is not detected, and disconnecting the client system from the content server (122) or hard disk by terminating the application program (144) and deleting the address handle if the termination message is detected.

In a preferred embodiment, a computer-readable storage medium for storing a multimedia contents protecting method of preventing multimedia contents, which are sent to an application program running on a client system, from leaking without permission through the use of an information providing system and the client system, the information providing system and the client system each having a CPU, a volatile storage (memory), a non-volatile storage (hard disk) and an input/output device (keyboard, monitor, etc.), and being connected to each other through wired or wireless internal communication means or means for communicating with an external network, the multimedia contents protecting method comprises:

the encrypting and uploading step of converting original contents (111) into an encrypted content package (121) using one or more encryption keys of a DRM server and uploading the encrypted content package (121) to a content server (122);

the initiating and connecting step of connecting the client system to the content server (122) and initiating streaming or downloading service by a user selecting contents in a Web server (122b) or FTP server;

the decrypting and playing step of decrypting and playing content data through an application program (144) in response to a signal from a player during sending in the case of a streaming manner, or after downloading in the case of a downloading manner; and the terminating step of terminating an operation of the application program (144) and a filtering operation and disconnecting the client system from the content server (122) in the case of a streaming manner when a DRM controller (141) detects a termination command of the application program (144).

From now on, this invention will be explained more detail using attached drawings.

Above-mentioned purpose, features, and advantages of this invention are explained in detail and concretely using one of preferred embodiments of Windows OS(Operating System) manufactured by Microsoft. But this invention cannot be limited to Windows OS, furthermore it is easily applicable to various OS such as Macintosh, Linux, Unix, and so on.

In this invention, client system is defined in advance as digital system such as PC, Notebook, PDA, cellular phone, set-top box, digital TV, Telematics system, etc., by which multimedia content is serviced connected with wire or wireless internet.

In general, streaming is mainly meant as a transmission technology of digital data, which is continuously played not stored in HDD. Streaming technology is divided into live and VOD method. Different with streaming, download technology is to play a digital data stored in HDD after all content data is received from external content server. Besides HTTP streaming is an intermediate technology of streaming and download, which can simultaneously support for play of digital data and save in HDD using hypertext transfer protocol.

In detail, VOD streaming is a data transmission technology of small part of content package, as is called "data packet", from external streaming server and digital content must be made in advance and deployed on streaming server for VOD streaming.

Since live streaming is characterized as a real-time data input from video camera to streaming server, live streaming is popular for sports game or live music performance. Since live streaming service from streaming server to client system is same to VOD streaming, data packet is also continuously delivered to client system.

Content data by HTTP streaming is repeatedly delivered as unit of data packet from HDD to application program, which is simultaneously saved in HDD using hypertext transfer protocol.

In the download method, client system's user can play the content data using application program after all content data is in advance delivered and saved to HDD of client system from external content server. In order to play the saved content in HDD, data packet is repeatedly delivered from HDD to application program.

Consequently HTTP streaming and download method are characterized as using of file system driver by application program for a data access. But live and VOD streaming are characterized as using of network driver by application program for data access, because of not saving into HDD. Although there are some different data accesses, application program may request a unit of data packet to network driver or file system driver.

BRIEF DESCRIPTION OF THE DRAWINGS

The above and other objects, features and advantages of the present invention will be more clearly understood from the following detailed description taken in conjunction with the accompanying drawings, in which:

FIG. 19 is a schematic diagram of header format of DRM package.

FIG. 20 is a schematic diagram of file format of license package.

FIG. 23 is a picture image of registration function of viewer programs in DRM administrator program.

DETAILED DESCRIPTION OF THE PREFERRED EMBODIMENT

Figure 1:
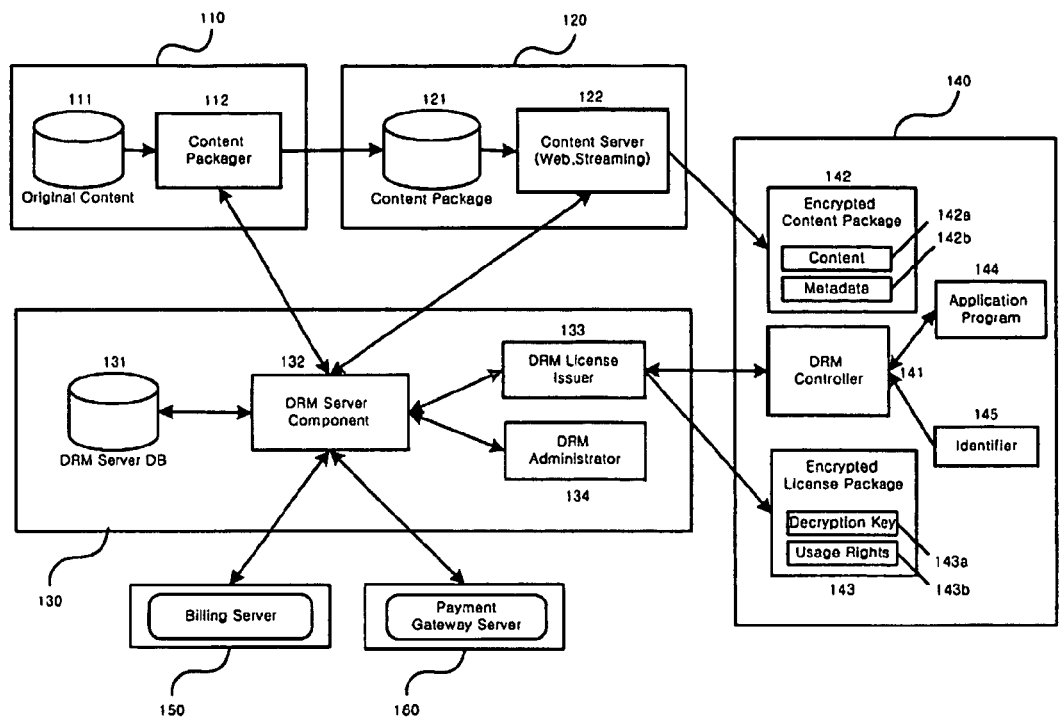
FIG. 1 is a block diagram of representative digital rights management system.

The present invention will be described in more detail as following. FIG. 1 is a block diagram of representative digital rights management system. To begin with, the original content 111 for streaming and/or download service, such as motion pictures, movies, music, online education content and so on, is packaged to encrypted content package 121 using content packager 112 of encryption means 110. The encryption key is generated at DRM server 130 and it is transferred to content packager 112. The encrypted content package 121 is uploaded to content server, which may be a streaming server 122a for streaming service or web/FTP server 122b for download service.

If client system's user 401 selects and clicks the icon/name of content on the homepage of content server 122, for example web server 122b, the content may be serviced to user through streaming or download service. After the user 401 selects the content item for the streaming service and therefore the DRM controller 141 is activated, encrypted content package 142 is delivered from streaming server 122a, connected with web server 122b, to client system 140. In the delivery method of streaming service, the data is received repeatedly as packet unit, which is not stored in HDD(Hard Disk Drive). On contrast with streaming service, the encrypted content package 121 is directly downloaded and saved in the storage device of client system, such as HDD from web/FTP server 122b. The streaming server 122a is not needed in the download service. In the case of HTTP streaming similar to download service, the data is delivered as packet unit from web/FTP server 122b to the storage device of client system, using HTTP protocol. Though the online content delivery from content server to client system is executed by wire/wireless internet as mention above, the offline content delivery such as CD, DVD or flash memory is also available in this DRM system.

The encrypted content package 142 using streaming or download service is composed of content data 142a and Meta data 142b. The content data 142a is encrypted from original content 111 and the Meta data 142b is a header including the various information related the encrypted content package 142. The position of Meta data 142b is preferably located in the initial stage in the packet.

For playing the encrypted content package 142 in the download service, the client system's user 401 must start the application program. But the starting application program is not needed in streaming or HTTP streaming service, due to the automatic starting. For playing the encrypted content package 142 in above services, the client system need to receive the license package 143 from DRM license issuer 133 of DRM server 130. The license package is composed of decryption key 143a and usage rights, such as using frequency, using period, and permission number of client systems, etc. In this invention, it is preferable to split the encrypted content package and license package respectively. It is very useful to the only one encryption of content package from original content, which can be distributed and sold independently with license package. The license package 143 is easily generated according to various combinations of usage rights in DRM license issuer 133 for the support of various business models.

After receiving the license package generally as encrypted, the identifier 145 in the client system 140 analyze the usage rights in the license package 143. If the client system's user 401 is passed properly through the usage rights analysis, DRM controller 141 decrypts the packet of encrypted content package 142 and transfers to the application program 144 in sequence. At this process, the above application program 144 is not the specific viewer program having decryption module for DRM system, but the general viewer program for original content format. Therefore it is not need to install the specific viewer program for DRM system, which is large obstacle to expand the DRM market in the world.

The repetition unit of decryption and playing process is explained in detail below. The repetition unit of decryption and playing process in download service is a fixed packet determined in advance the request of application program, because whole encrypted content package is already downloaded and saved into HDD of client system from web server. The repetition unit in HTTP streaming service is almost same as download service, but the decryption and playing process is executed during download process simultaneously.

The repetition unit of decryption and playing in VOD and live streaming service is a variable packet depending on the internet speed, which is feeding to application program in sequence only on volatile memory but on nonvolatile HDD.

Therefore DRM controller 141 decrypts in sequence the encrypted content package as packet unit, regardless of content service method.

DRM server 130 in the DRM system generates, issues and manages the encryption key for encrypted content package. In addition, DRM server has the role of the license management, authentication of users, client computer, application program, etc. DRM server 130 is composed of DRM server DB 131, DRM server component 132, DRM license issuer 133, and DRM administrator 134. DRM server DB 131 is used for storing the various data of DRM system, and DRM server component 132 is responsible for various information exchange and communication between content packager 112, content server 122, client system 140, and billing server 150. DRM license issuer 133 is in charge of issuing license package and DRM administrator 134 is administrator program for the configuration and management of various parameters, such as member, content, log analysis, etc. If there is charged content service, the charge request is executed through the billing server 150 for deferred payment or payment gateway server 160 for prepayment.

Though the total DRM system of FIG. 1 is some complicated, it may be divided into 2 categories of content supply system and client system. The content supply system is composed of content packager 112 as encryption means 110, content server 122 as provision means 120, and DRM server 130. The main function of content supply system is the generating and preparing process for the customer service of encrypted content package 121. Since the each content packer, content server, and DRM server is software products, these can be installed in one or more computer systems. In client system 140, the DRM controller 141 plays an important role in the process of receiving, decryption, and playing of encrypted content package.

The upload process of encrypted content package to content server is explained in detail below.

Figure 2:
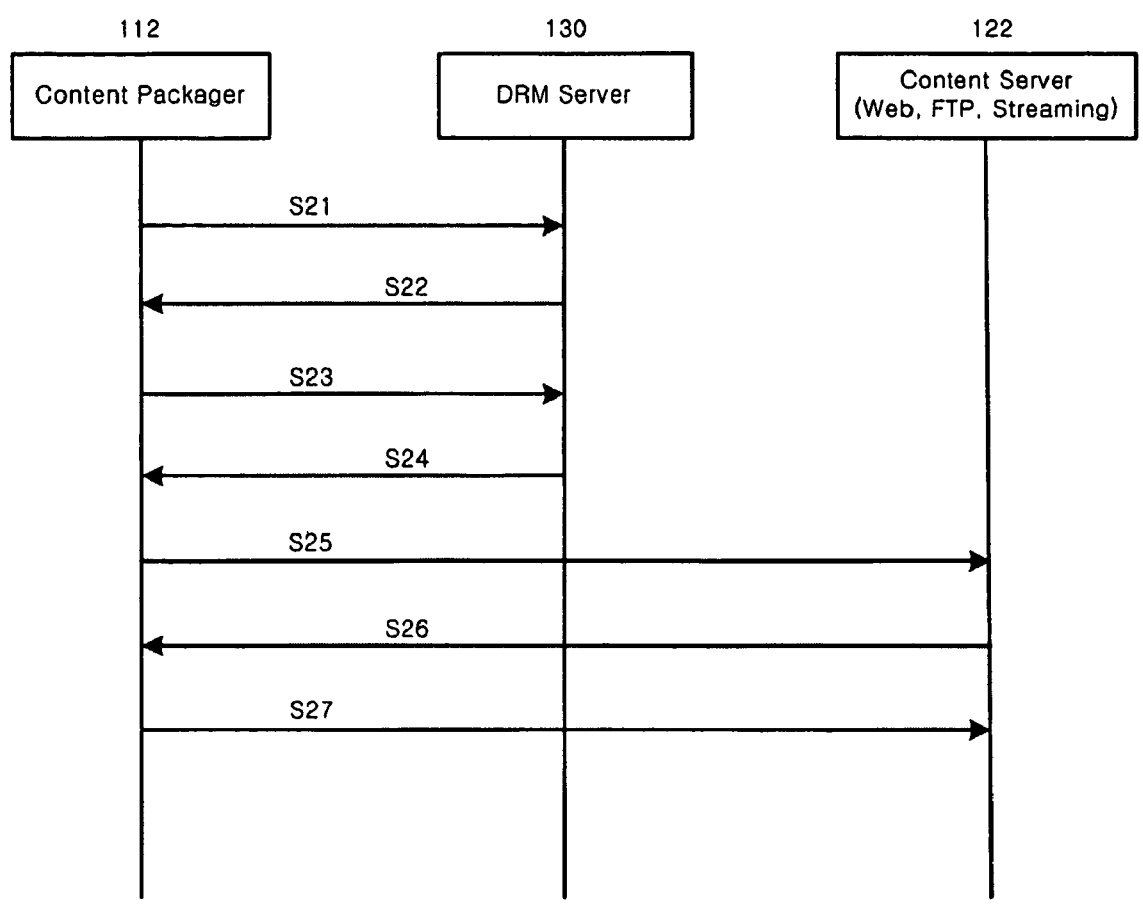
FIG. 2 is a sequence chart of generation process of encrypted content package in the content providing system.

FIG. 2 is a sequence chart of generation process of encrypted content package in the content providing system. The encryption and upload process is showed sequently in this figure. To begin with, the software programs of content packager 112, DRM server 130, and content server 122 are needed to install in advance, and a basic configuration operation is necessary for DRM system. If the content packager 112 program is executed, the user authentication of ID and password is needed to connect with DRM server 130. This is step S21 in the sequence chart. At step S22, DRM server 130 will notice the success result to the content packager 112 if the authentication process is success. The content packager 112 requests the encryption key to the DRM server 130 after selecting of the original content 111 encrypted. This is step S23 in the sequence chart.

At step S24, DRM server 130 generates an encryption key with random size using the so-called Pseudorandom Number algorithm. Therefore the content packager 112 will produce an encrypted content package 121 from original content 111 using received encryption key. At this process, content packager 112 can encrypt the original content with the unit of file or directory respectively.

It is preferably to use the block cipher algorithm with a block unit for encryption, because of higher security and efficiency. The exchange method of encryption and decryption key for present DRM system is not dependent on whether private key or not public key. If the content supply is for streaming service, the encryption can be encrypted either as a whole or part of data content without content header encryption. Since the content header is composed of various information for the streaming service between outside streaming server and client system, the content header is better excepted of encryption. The metadata produced in the present DRM system may be included as extra DRM package header in the encrypted content package. If the content supply, on the other hand, is for download service, the original content 111 consisted of header information and content data may be encrypted either as a whole or part. It is better to encrypt as a whole in download service. The detail explanation is attached in later.

As step S25, the authentication process at content server 122 such as web or FTP server is executed for the uploading the encrypted content package 121 using File Transfer Protocol. After receiving process of the successful authentication (S26), encrypted content package 121 is uploaded on the content server 122 as step S27. The upload method by FTP as mentioned here in preferable embodiment may be easily changed to file copy method in general internal/external network system. As mentioned until now, the encryption and upload process for streaming or download service is ended.

From now on, the content playing process will be explained.

Figure 3:
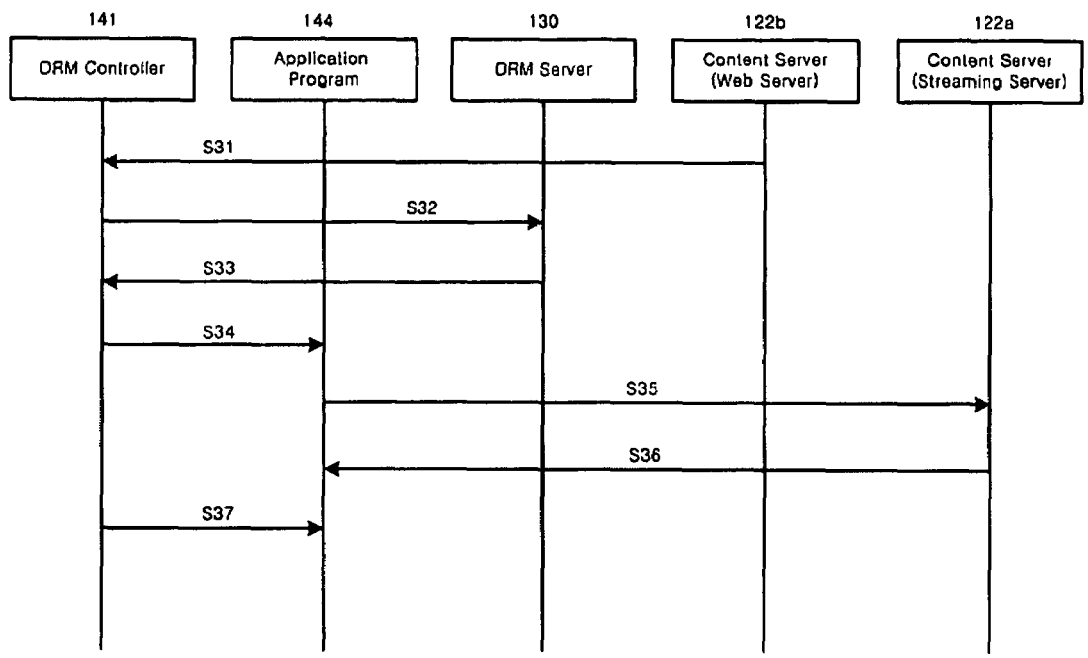
FIG. 3 is a sequence chart of playing process of encrypted multimedia content using streaming service.

FIG. 3 is a sequence chart of playing process of encrypted multimedia content using streaming service. To begin with, it is necessary to install the DRM controller 141 in client system 140 for content playing. If the DRM controller 141 is not installed yet in client system 140, it may be to install the DRM controller when a client system's user 401 use the content service of DRM applied, or after member subscription. DRM controller 141 may be downloaded and installed automatically using ActiveX control method. After installing process of the DRM controller 141, the DRM controller may be checked with version number and only upgraded when new version is released.

Although not shown in this figure, the authentication process of user is executed for the content playing. In the download service, the authentication process is executed after all the content is downloaded. If client system's user clicks the content for content playing, a new windows for authentication process is generated and, then, the user pass through with ID and password. In the case of VOD, live, HTTP streaming service, the authentication process is executed as follows. To begin with, the client system's user 401 will connect at the web page for content service and pass the user authentication with ID and password. The web server 122b send the authentication information to DRM controller 141 of client system 140, which is executed using identification information of content and user. This is step S31 in the flowchart.

As step S32, the DRM controller 141 send the above identification information of content and user for DRM server 130. If authentication result of DRM server is success, DRM server send the encrypted license package including the decryption key 143a and usage rights 143b to DRM controller 141 of client system. This is step S33 in the flowchart. It is preferable to execute above authentication process and receiving process of license package only one time for the efficient DRM system.

As step S34, if the authentication result from DRM server is success, DRM controller 141 will activate the application program 144 supporting the file format of original content and, then, send the URL address of content server 122 as streaming server to the application program. Above procedure is executed for VOD or live streaming service. In the case of download service, the storage position information of downloaded content is transferred to the application program instead of URL address. In the case of HTTP streaming service, it is similar to the sum of VOD/live streaming and download service and therefore it is needed the URL address of not streaming server but web/FTP server.

In the case of VOD/live/HTTP streaming service, the application program 144 will request the content data transmission to external content server 122 such as streaming or web/FTP server through network device for network communication. In the case of download service, the application program will request the content data to HDD of client system. The content data is transferred as packet unit from content server 122 of external network or HDD of client system according to the periodic request of application program. In the case of HTTP streaming, the data packet from external web/FTP server is stored in HDD and played simultaneously. This is step S36 in the sequence chart. The transferred data packet is decrypted by the DRM controller and, then, the application program plays the decrypted data until the end of content data.

During the process of data transmission and decryption, DRM controller 141 will keep under observation, and detect the message generation of user's ending order. If the ending message is detected, DRM controller 141 will kill the application program.

In general, the content service between streaming and download is some different as mention above. In the case of streaming service, the content service is preferably started after user authentication. On the other hand, the user authentication for the download service is preferably executed after all the content is downloaded and before the users play the content.

In this invention, the application program 144 is not "specific program with decryption function for DRM" in almost prior technologies but the general viewer/player program supporting for the file format of original content 11 before encryption. There is no need to develop the specific program with decryption function for DRM, which is very convenient for DRM applications. The DRM controller 141 of client system may control the application program, execute a filtering operation, decrypt the encrypted content data, and transfer the decrypted data to application program. A network filter driver for streaming and file filter driver for download service is needed for above filtering operation. The application program cannot distinguish the content data due to the filtering operation whether the DRM is applied or not.

The main idea of this invention is applicable not only Windows Media Player of Microsoft, but also Realplayer of Realnetworks and Quicktime player of Apple, etc. Additionally, a variable player of OCX(OLE Custom Control) technology can be made using the component of above application programs into web browser.

Figure 4:
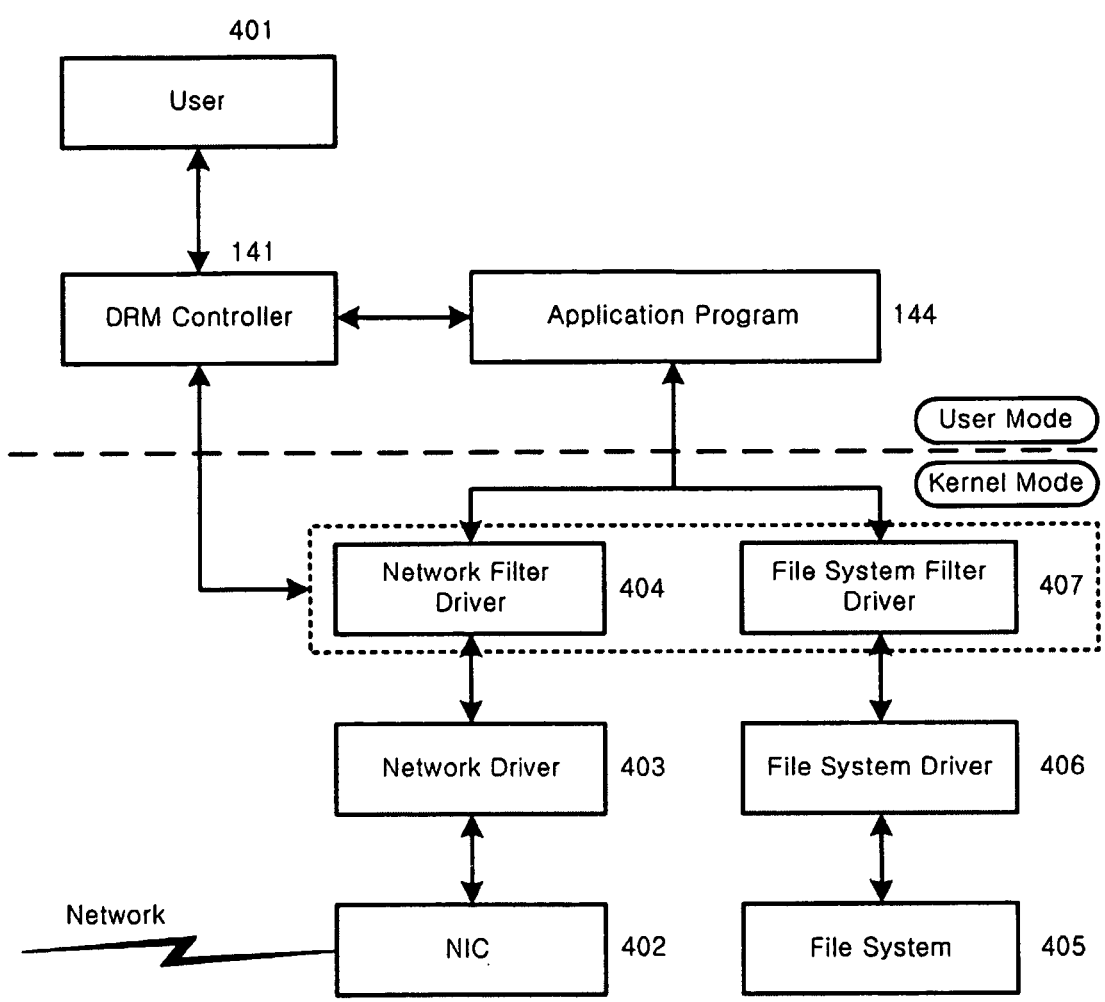
FIG. 4 is a block diagram of playing process using streaming and download service in client system after DRM adoption.

From now on, the control technology of client system will be explained in detail. FIG. 4 is a block diagram of playing process using streaming and download service in client system after DRM adoption. For streaming and download service, the client system needs to install the DRM controller 141 operating in user mode, and network/file filter driver operating in kernel mode. The file filter driver 407 is needed for VOD/live streaming service, which executes the filtering operation of encrypted content data transferred through the network device. The file filter driver 404 is needed for HTTP/download service, which executes the filtering operation of encrypted content data downloaded in file system such as HDD. At the above explanation, the filtering operation means that network/file filter located between application program in user mode and device driver in kernel mode executes the hooking, changing, decrypting, and restoring of message and data packet, and transferring to the application program.

The filtering operation for streaming service is explained as following. Although not shown in FIG. 4, if the client system's user 401 selects the content service on web page connected with content server 122, DRM controller 141 is activated automatically and starts the application program for the file format of that content. In the streaming service, then, the encrypted content data is received through network device. The content data received in the client system is transferred to application program, through NIC(Network Interface Card) 402, network driver 403, network filter driver 404, one by one. The NIC 402 of client system is a network device for the external communication. The representative network driver 403 of Windows system is preferably TDI (Transport Device Interface) driver 506, which plays a role for the acceleration of execution speed of network program and the communication with protocol stacks in kernel mode. The network filter driver 404 is manufactured for this invention, which is inserted to above network driver 403 and executes the filtering operation connected with DRM controller 141, such as a hooking, changing, and decrypting of message and data packet, and transferring to the application program 144.

Compared with streaming service, the filtering operation in file filter driver 407 for download service is explained as following. Although most of filtering operation is very similar between network and file filter driver, there are some difference. Different with network filter driver 404, file filter driver 407 needs the additional buffer memory for decryption and the restoring process of file offset and file length. Above difference is originated from the different reading style of application program between streaming and download service.

In the download service, the application program 144 request a specific value of file offset and file length to the file system 405 of client system. But the application program in streaming service does not request the a specific value of file offset and file length and the received content data is transferred continuously to application program, since the receiving speed of content data is dependent on the external network speed.

In the case of HTTP streaming service, the file filter driver 407 is more preferable than the network filter driver 404, since received data packet by HTTP streaming is saved in HDD and, then, transferred to application program.

After the decryption procedure in network/file filter driver is executed by filtering operation, there may be a weakness from a viewpoint of security. If a new device driver is loaded above the network/file filter driver toward the application program 144 in this invention, the decrypted content data may be hacked or copied illegally. Since the network/file filter driver therefore must be loaded at highest level of device drivers activated in operating system, the both filter drivers is more preferably to equip the detecting means for a detecting of unauthorized device driver loading. If an unknown device driver is loaded above the both filter drivers, the filtering operation of hooking and decrypting, and so on, must be stopped for a higher security. In addition, the both filter drivers preferably needs the detection function of process kill for the higher security. When the detection function of process kill detects the message of process kill, it will end the process and stop the filtering operation.

The content service process with DRM application for streaming service will be explained in detail using FIGS. 5-9 and for download service using FIGS. 10-16. The file formats of content and several picture images of DRM system will be shown in FIGS. 17-28.

Figure 5:
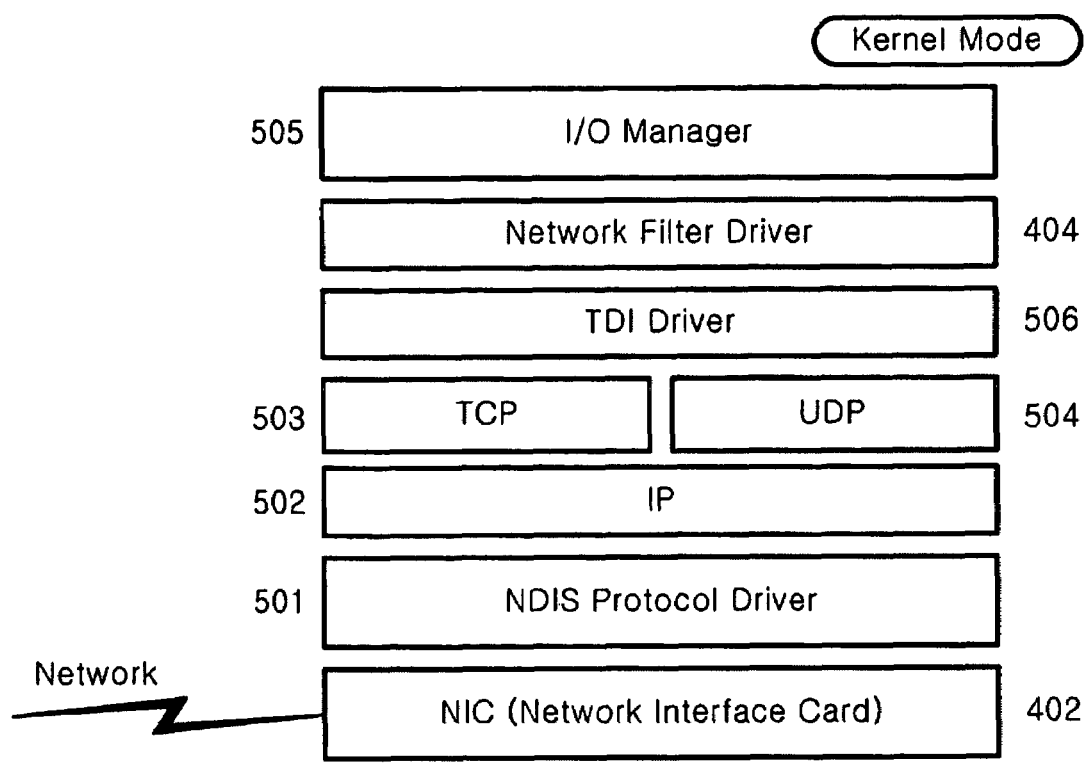
FIG. 5 is a block diagram of network filter driver positioned in network layer model.

FIG. 5 is a block diagram of network filter driver positioned in network layer model. Although FIG. 5 is an embodiment based on Windows operating system of Microsoft, there will be very similar in another operating system such as Unix, Linux, etc. The data packet in the client system received from external network is transferred a NIC 402, NDIS(Network Driver Interface Specification) protocol driver 501, IP(Internet Protocol) 502, TCP(Transmission Control Protocol) 503 or UDP(User Datagram Protocol) 504, TDI driver 506, network filter driver 404, I/O(Input/Output) manager 505, in good order respectively.

In FIG. 5, the NIC 402 is the network interface card for the transmitting and receiving of data bit connected with external network, and NDIS protocol driver 501 is a network interface driver manufactured by Microsoft. The IP 502 with an above TCP 503/UDP 504 is responsible for the transmitting of the data packet with a below network device drivers. TDI driver 506 located above TCP and UDP is a representative network driver responsible for the communication between application program and network device driver. The network filter driver 404 is preferably located above TDI driver 506 toward the application program, since the network filter driver executes the rearrangement and transmission of random data packet received through TCP and UDP. The I/O manager 505 located in the highest level of kernel level is responsible for the loading and management of a various lower device drivers.

The network filter driver 404 located between the application program 144 and TDI driver 506, the important module of this invention, executes the filtering operation such as a hooking, changing, decrypting, restoring of the message and data packet, and transferring to the application program.

In general, the TCP is more useful and reliable for the Internet broadcasting of streaming service. It is needed to use the UDP for the high-speed transmission of musical performance or real-time sports broadcasting. The transmission protocol of streaming data in the present invention therefore must be developed to use an either TCP or UDP.

If the encrypted content data is received by using TCP, the network filter driver will decrypt the received data one by one and transfer to the application program because the received data packet is already rearranged or corrected at the TDI driver after the receiving of content data. If the content data, in other hand, is received by using UDP, the additional function of rearrangement or correction for the received data packet will be furnished in the network filter driver because of a data missing owing to the high-speed transmission in UDP.

Figure 6:
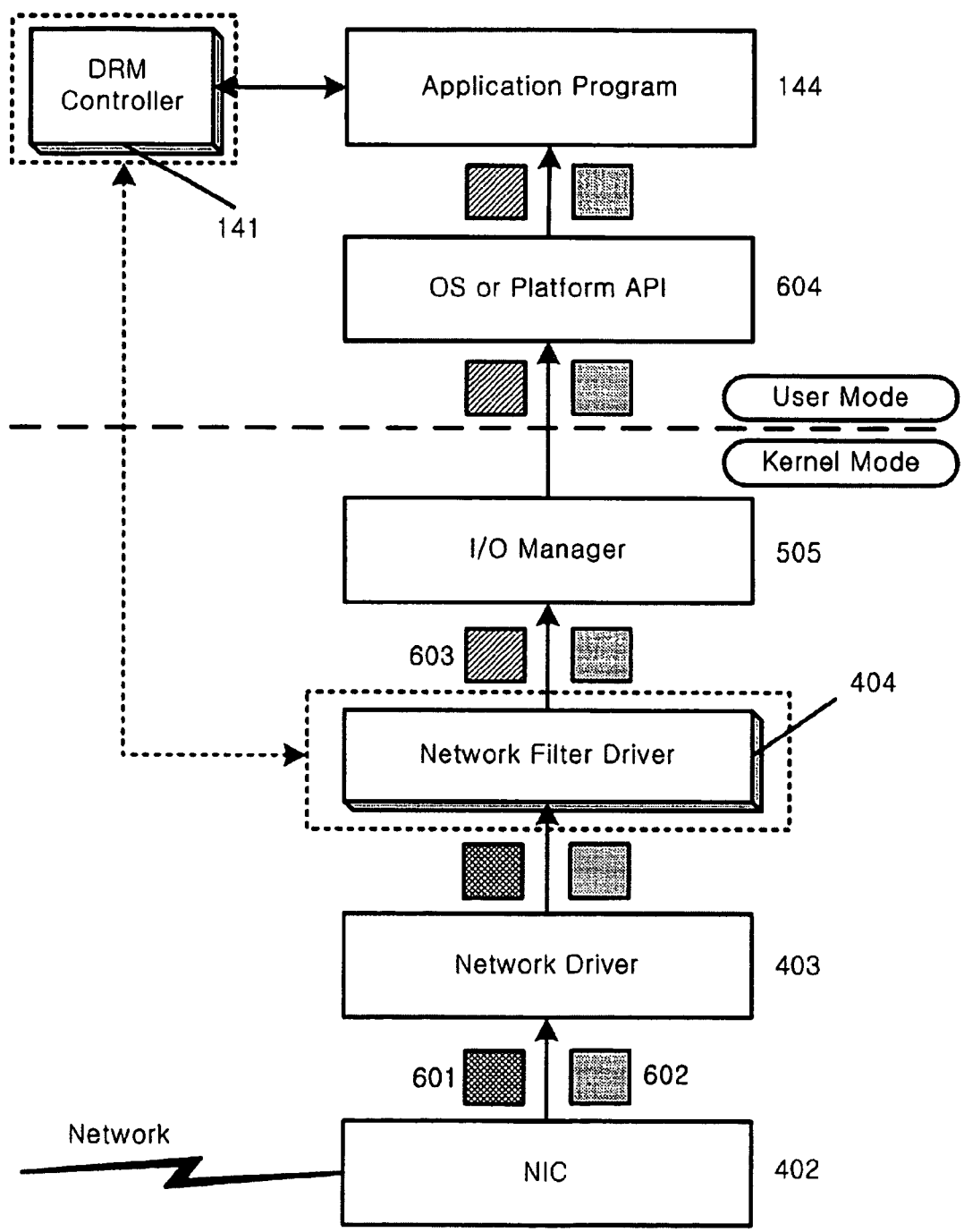
FIG. 6 is a block diagram of transfer process of encrypted streaming content data in client system.

FIG. 6 is a block diagram of transfer process of encrypted streaming content data in client system for VOD or live streaming. If the encrypted content package is transferred from external content server to client system, the data packet is transferred to the application program 144 in the routine of a NIC 402, network driver 403, network filter driver 404, I/O manager 505, and OS or platform API 604, one by one, respectively. The core components of client system in present invention are DRM controller 141 operated in user mode and network filter driver 404 in kernel mode.

In more detail, DRM controller 141 in user mode executes several operations such as an access permission inspection, authentication of user and client system's hardware, inspection of license and usage rights, receiving of decryption key, activation and control of network filter driver 404, etc. The network filter driver 404 located above network driver 403 in kernel mode executes the filtering operation such as a hooking of message and data packet between application program 144 and network driver 403, generating of new event, changing of network connection, identification of encrypted data, decryption of encrypted content data, transmission of decrypted data to application program, etc.

If a new device driver is loaded above network filter driver 404, the decrypted content data may be hacked or illegally copied. Therefore an additional function of detecting the device driver loading and stopping the filtering operation is furnished in present DRM system for higher security. It is preferably for this DRM system to have an additional function of detecting the ending message of application program. Most of functions explained above can be realized to either in user or kernel mode, which is out of question in real DRM system.

As stated above, application program 144 may communicate and receive a data packet intelligently connected with external streaming server 122a for content service by streaming method. Network driver 403 is taking charge of role that configures various communication environments with external streaming server 122a. Therefore, network filter driver 404 of this invention may be preferably located between application program 144 and network driver 403, and will execute a filtering operation of hooking, changing, decrypting, and restoring of message and data packet, and transferring a decrypted content data to application program 144.

By the way, encrypted content packet 142 that application program 144 receives from external streaming server 122a may be composed of contents data 601, the same as 142a, and control information 602, the same as 142b. The content data 601 is equivalent to real data of sound and motion picture, and control information 602 is various control data for smooth content service. One of important features in this invention is to encrypt not control information 602 but content data 601 for efficient streaming service, which is not needed to change the hardware system structure and does not occur the overload of network traffic of existent streaming service after DRM adoption. As illustrated in drawing, encrypted contents data 601 in drawing is decrypted in network filter driver 404, and decrypted content data 603 is transferred to application program 144. On the other hand, control information 602 for smooth streaming is transferred to application program 144 in state of not encrypted.

In general streaming method, "evert handler" is used to treat a lot of content data exchanged through network. Event handler is a kind of point function program, which achieve special work being called when some special event occurred in hardware device. It means that network connection is disconnected if event handler is 0 in network device, and that specific process through network is preceded if 30 event handler is not 0.

Also, network driver 403 executes a function of receive, send, connect, and disconnect, linked with application program 144. In this invention, network filter driver 404 is manufactured specially and located on top of toward application program 144. Network filter driver 404 executes a filtering operation of hooking, changing, decrypting, restoring of message and data packet between application program 144 and network driver 403, and transferring a decrypted content data to application program.

Figure 7:
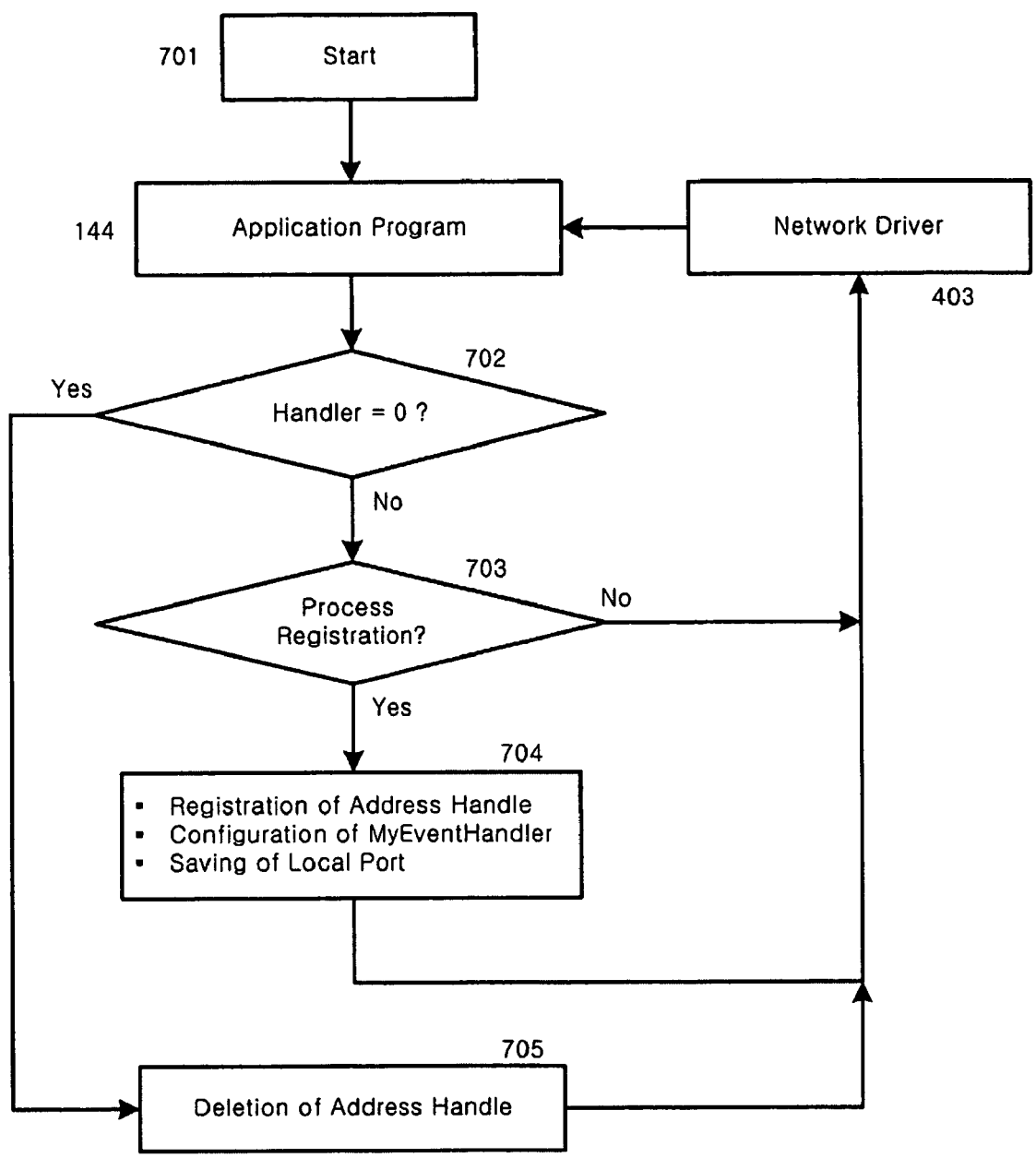
FIG. 7 is a flow chart of preparing process of application program for network connection.

FIG. 7 is a flow chart of preparing process of application program for network connection. Usually, if client system's user 401 selects and clicks a content on web page of content provider for streaming service, DRM controller 141 will activate and temporarily suspend application program 144 after DRM controller execute a few authentication procedures using information received from DRM server 130.

After DRM controller 141 executes an initialization procedure of network filter driver 404, DRM controller registers a PID (Process Identifier) as global variable of network filter driver 404 and passes decryption key to network filter driver. After that, DRM controller activate application program 144 again.

Then, application program 144 delivers message of preparation process to connect with external streaming server 122a to network driver 403. At this time, network filter driver 404 hooks message transferred from application program 144 to network driver 403. By next time, it is executed using message hooked that whether handler is 0 is confirmed for verification of network connection.

If handler is 0, network filter driver 404 will delete registered address handle 705 and transfer a message to network driver 403 since that message is disconnection order of network. If handler is not 0, network filter driver will confirm the registration of PID of above application program in network filter driver. This confirming process is 703. If PID is not registered, network filter driver will pass message to network driver 403 because it mean that other application program calls network driver. But if PID is registered after the initialization process of network filter driver, network filter driver will execute registration of address handle for filtering and distinction of new network address, configuration of MyEventHandler, and save of local port. This changing process is 704. After that, above changed message is delivering to network driver 403.

At this point, registration process of address handle is a process for the distinction of network address of different application program and configuration process of MyEventHandler is to make a new event for the decryption operation of encrypted content data received through network. Additionally saving process of local port is to determine the local port of client system for network communication with external streaming server 122a.

After that, network driver 403 delivers a message of complete preparation for connection with external streaming server 122a to application program 144.

Figure 8:
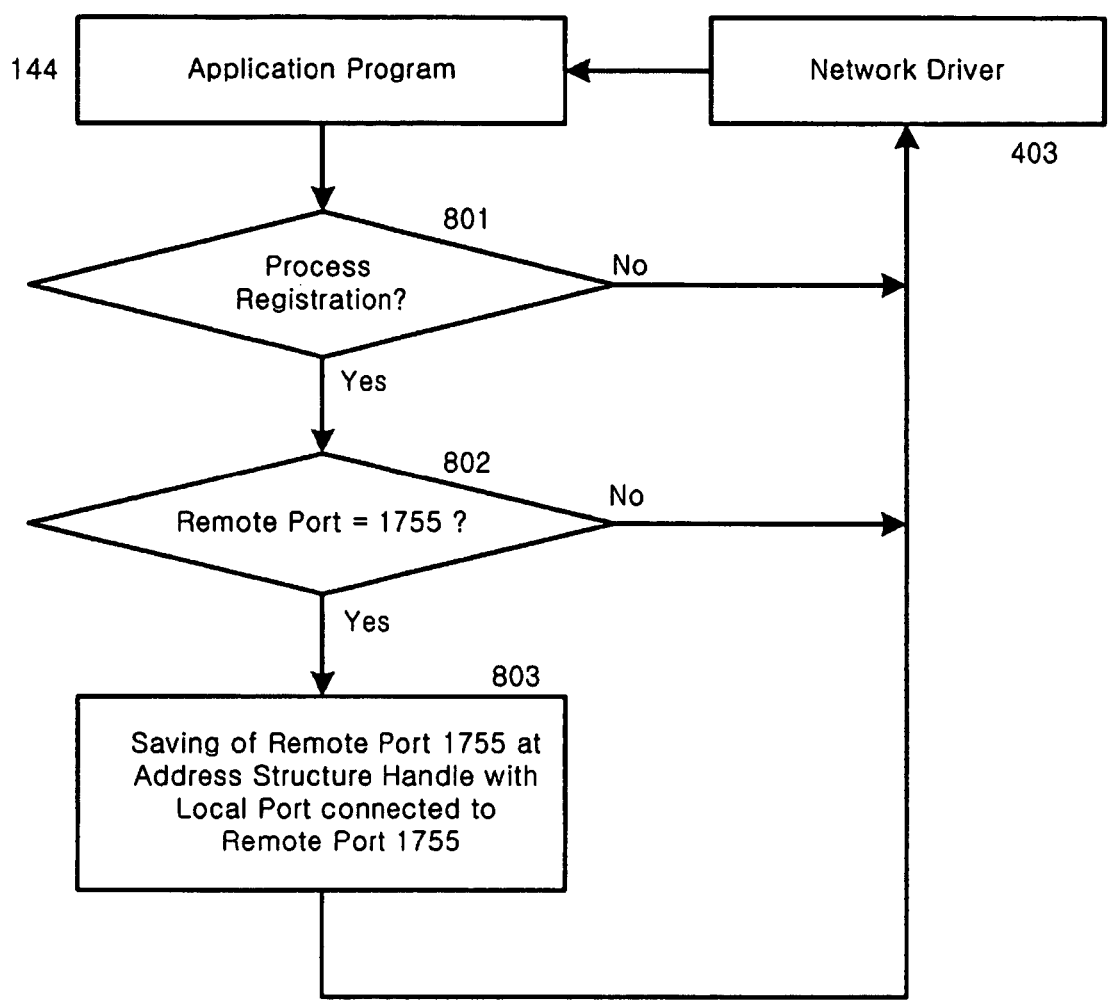
FIG. 8 is a flow chart of connecting process of application program for network connection.

FIG. 8 is a flow chart of connecting process of application program for network connection. As stated above, if application program 144 receives a message of complete preparation for connection with external streaming server from network driver, network filter driver 404 will hook again the message transferred from application program to network driver and confirm the registration of PID one more time. This process is 801. After that, it may be confirmed whether the remote/server port is 1755. If the remote port is 1755, it means that streaming server 122a is a Windows Media Server. After therefore network filter driver 404 will save the remote port 1755 at address handle structure with local port connected with remote port 1755, it is delivered to network driver 403. This process is 803. In addition, there are original handler, changed handler, and the information of local and remote port through hooking process, stored in address handle structure.

For reference, each protocol is using a particular number of remote port, for example, it means that it is FTP(File Transfer Protocol) if port number is 21, World Wide Web HTTP if 80, Post Office Protocol Version 3 if 110, MMS(Microsoft Windows Media Sever) protocol of Windows Media Server if 1755, etc. In this invention, the confirmation process of whether remote port is 1755 is explained for a simple embodiment and it is not constricted by MMS protocol. If the streaming protocol is not MMS protocol, the confirmation process of remote number can be easily executed for certain streaming method.

Figure 9:
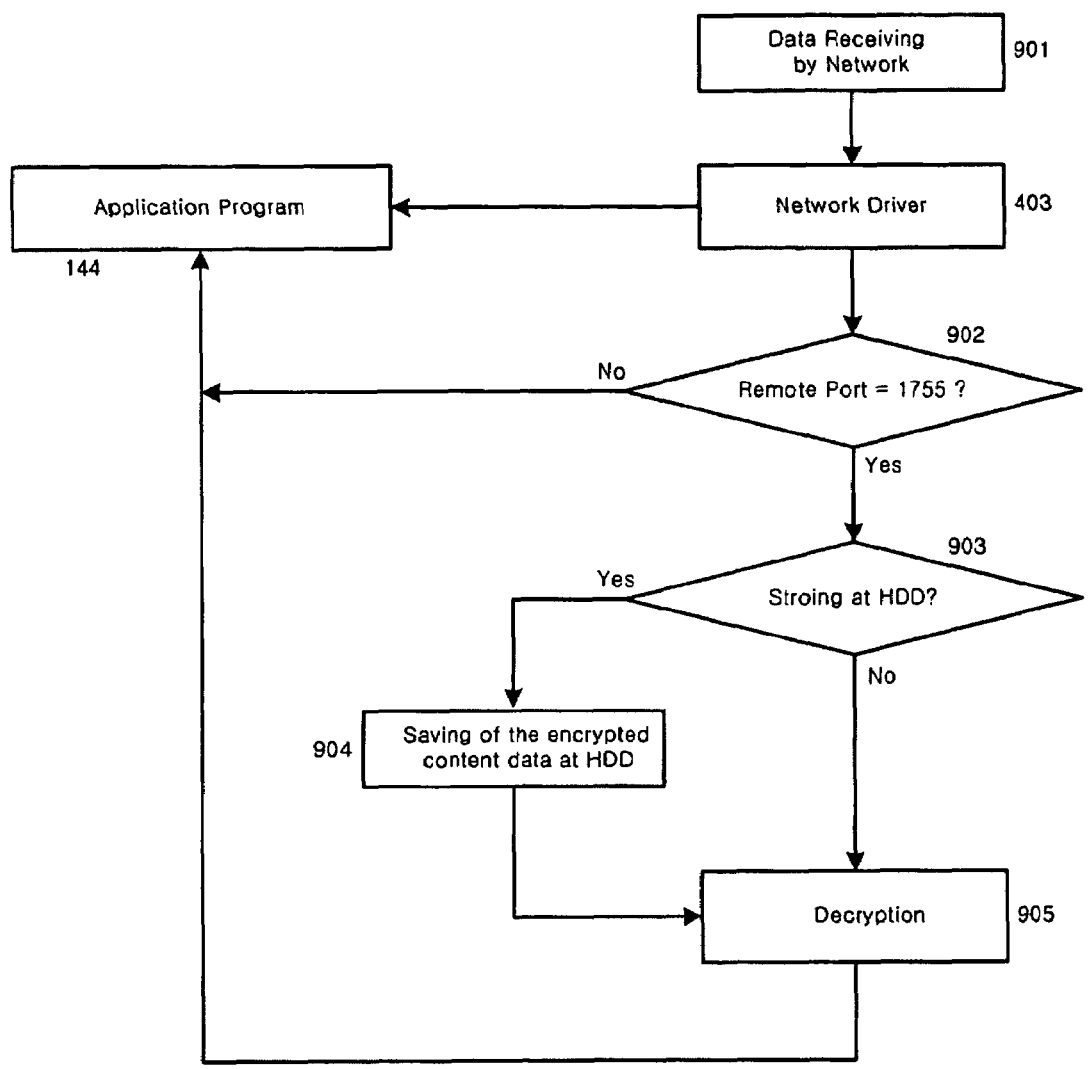
FIG. 9 is a flow chart of decrypting process of received data in streaming service.

FIG. 9 is a flow chart of decrypting process of received data in streaming service. After above the connection process for network communication is carried out, the network driver 403 will start to receive the data of encrypted content package 142 through network device. If the received data of encrypted content package is delivered to network driver 403, MyEventHandler will be activated which is configured in advance at the preparation process for network connection. If MyEventHandler is activated, received data through network driver 403 is confirmed whether a remote port is 1755 or not.

If the remote port is not 1755, the received data is passed since it is a data requested by different application program. If the remote port is 1755, it means that the received data is requested by the application program in this invention.

After that, an additional embodiment of confirmation process of storing at HDD can be executed which is not essential process. If the received content data is to be stored in HDD, the received data may be delivered to a decryption process after it is stored at a temporarily storage region in HDD. If the received data is not to be stored, it is directly delivered to a decryption process 905.

The decryption process 905 is proceeded by using of decryption key, which is registered in advance on network filter driver 404 as global variable. The decryption is a reverse process in compared with encryption. Decrypted content data after decryption process is delivered to application program 144.

As mention above, the encrypted content package 142 is composed of control information without encryption and encrypted content data. Therefore not-encrypted control information is directly delivered to application program and encrypted content data is delivered to application program after proper decryption.

Although it is supposed basically in this invention that all content data is encrypted, the encryption may be partially executed for efficient encryption and decryption process. If all content data is encrypted, the decryption is easily executed for encrypted content data. If content data is encrypted in part, encryption may be executed for the specific key frame of sound or motion picture.

The purpose of partial encryption of content data is mainly to increase the efficiency of encoding and decoding. The method of partial encryption must be determined in advance and various partial encryptions are easily made. The information of encryption method is included into header of content package and delivered to client system.

If encrypted content data is stored in a temporary storage region of HDD, the content can be stored simultaneously as encrypted content after client system's user views the content by streaming method. This function of simultaneous save of streaming content is very useful for the high reusability of content, for example, online education content, which is easily setting up by content provider. While client system's user can view the content saved in HDD repeatedly, the content copyrights can be protected securely because of content encryption and an illegal copy product cannot be reproduced in another system without proper usage rights.

If a content provider wants to increase the encrypted content among content users, DRM system of this invention can support the super-distribution by the setting up DRM server information included in encrypted content package.

While main explanation until now was executed in priority about VOD streaming content service that is encoded beforehand, the technology of this invention also can be similarly applied to live streaming content service. That is, the content for VOD streaming is already made in usual, but the content for live streaming of sports game, news, and online performance is encrypting in the encoding sever and decrypting in client system, as real-time.

In the case of general live streaming, the audio and video data generated from camera and microphone is encoding as multimedia file at encoding server, which is delivered to streaming server for live streaming service. Since an original content 111 is a multimedia file generated at encoding server for live streaming with referred to FIG. 1, the content packager 112 for encryption must be linked with encoding system.

At this time, a real-time encryption at content packager 112 is preferably executed on the network filter driver located above network driver of encoding system for live streaming. The encryption process of network filter driver of encoding system is almost similar to the decryption process of client system, which is mentioned in detail. That is, the encoded content in encoding system can be encrypted by hooking and real-time encrypting using network filter driver before the transmission of content data to streaming server 122*a*. The encryption/decryption method for live streaming is very similar to that of VOD streaming which is mentioned beforehand.

In addition, it is needed to support UDP instead of TCP for DRM multicasting service which is more popular recently for high transmission efficiency. Since data transmission error may be occurred by UDP during network transmission process, network filter driver of client system must additionally have an adjustment function for transmitted data error, unlike TCP.

Below Detailed explanation using FIGS. 10-16 is performed for download content service.

Figure 10:
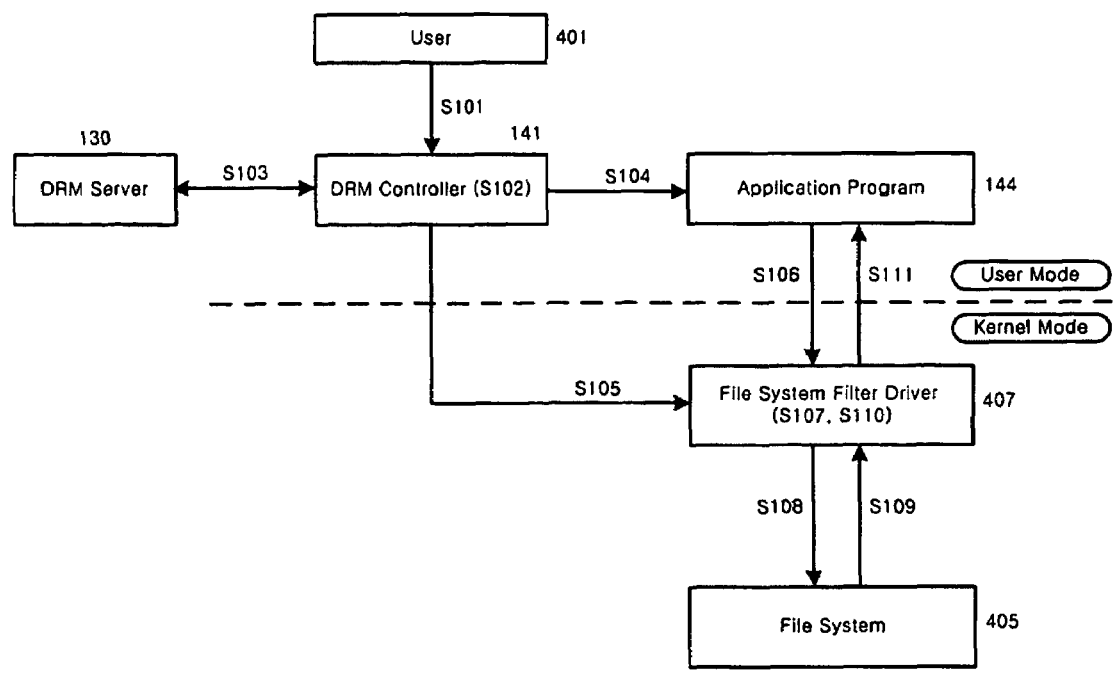
FIG. 10 is a block diagram of configuration and operation process in client system for download service.

FIG. 10 is a block diagram of configuration and operation process in client system for download service. DRM server 130 is connected with client system, in which DRM controller 141 and application program 144 are operated in user mode. In addition, file filter driver 407 must be installed in advance and operated in kernel mode. File system 405 is, for example, HDD for the storage of encrypted content package.

To begin with, it will be explained that the encrypted content package stored in file system 405 of client system may be decrypted and played with components of DRM system.

First, if client system's user 401 selects and opens an encrypted content package, DRM controller 141 connected with encrypted content package will be activated automatically. This step is S101. The file open message is executed by the order of file data transmission from HDD to application program in the case of download method. In the case of HTTP streaming method, the open message is the click action of content icon or title on the web page.

The DRM controller 141 will obtain various information of encrypted content package, such as file name, file size, server URL, content information, etc. through the analysis of header information of content package. This step is S102. After that, DRM controller 141 will obtain a license file through an authentication procedure of application program and user connected with DRM server 130. If an authentication procedure is OK, a license package is properly generated from DRM server and delivered to DRM controller of client system. This step is S103. Using the header information of content package, DRM controller can activate the application program support for original file format of encrypted content package.

After that, OS generates a PID according to application program, DRM controller will suspend the application program temporarily after a receiving of PID. In addition, DRM controller will register various information on file filter driver 407, such as encryption key included in license file, PID, file name, etc. This step is S105. Additionally file handle will be registered on file filter driver, which is explained later at the process of file opening.

After registration process of various data, application program will be activated again. When a order of file open and close message is made by user, the file filter driver located between application program 144 and file system 405 will execute a filtering operation of hooking, generating, changing, deleting, and restoring of message and data packet. Above process will be explained in detail and the file read process is described as following.

During the file read process, application program 144 requests a file offset and file length to file system 405. This process is S106. The file offset and file length have specific values according to application program. After the file filter driver 407 hooks a message of file offset and file length, which must be changed to 16 byte unit according to the encrypted content package for this invention. The step is S107. Besides file filter driver will assign a specific address of buffer memory for decryption.

After that, the changed file offset and file length will be requested to file system 405 and the requested package data will be loaded on the buffer memory of temporary storage region, which will be explained in detail using FIG. 15. After the file filter driver 407 decrypts the encrypted content data using of decryption key included in license file on the buffer memory, the file offset and file length is restored as original one requested by application program. The process is SI 10. The restored file offset and file length as original one will be transferred to application, which is S111.

Changing and restoring process of file offset and file length is needed for exact decryption, because the encryption is executed as 16 byte unit. Therefore file offset and file length transferred to file system is preferably requested as 16 bytes unit and decryption is executed as 16 bytes. Since requested file offset and file length is different according to application program, file filter driver 407 located between application program 144 and file system 405 will execute a real-time filtering operation. The filtering operation is such as a hooking and changing of file offset and file length, encrypting of encrypted content data, restoring of original file offset and file length, and transferred to application program. Since all filtering operation is executed in kernel mode of client system, the application program may not distinguish whether the content data is encrypted or not.

FIGS. 11-14 shows how the message detection function of file filter driver 407 will be executed when the hooked message is an open, read, close process, and end process of application program.

Figure 11:
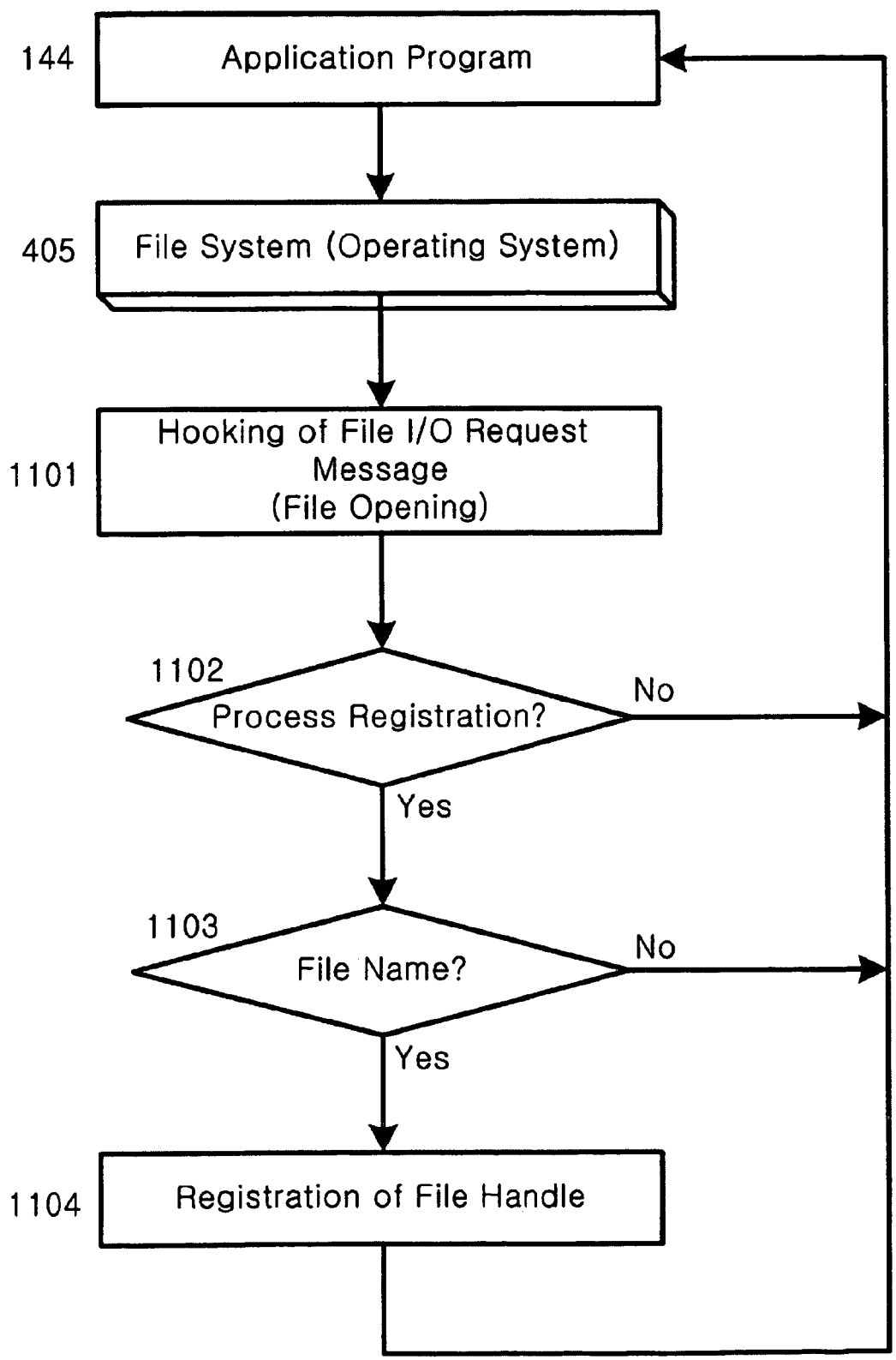
FIG. 11 is a flow chart of file open process of encrypted content package downloaded in file system.

FIG. 11 is a flow chart of the open message of encrypted content package downloaded in file system.

To begin with, if application program 144 orders a file open message into a file system of OS, file filter driver 407 will hook a I/O(Input/Output) message from file system 405 to application program 144 and will confirm whether a PID of application program is registered or not on the file filter driver. This process is 1102.

If PID of application program is not registered on the file filter driver 407, it means that the file open message is delivered to application program 144 since its process is related with open message of general file instead of encrypted file. If PID is already registered, it is followed to confirm a file name for next process. This process is 1103.

If file name is already registered on the file filter driver, the registration of file handle is proceeded and the open message is delivered to application program since its process is related with open message of encrypted file with DRM adoption. That is, file filter driver 407 may hook an I/O message delivered from file system 405 to application program 144 during a performing of open message. Main function of open message is the registration of file handle.

Figure 12:
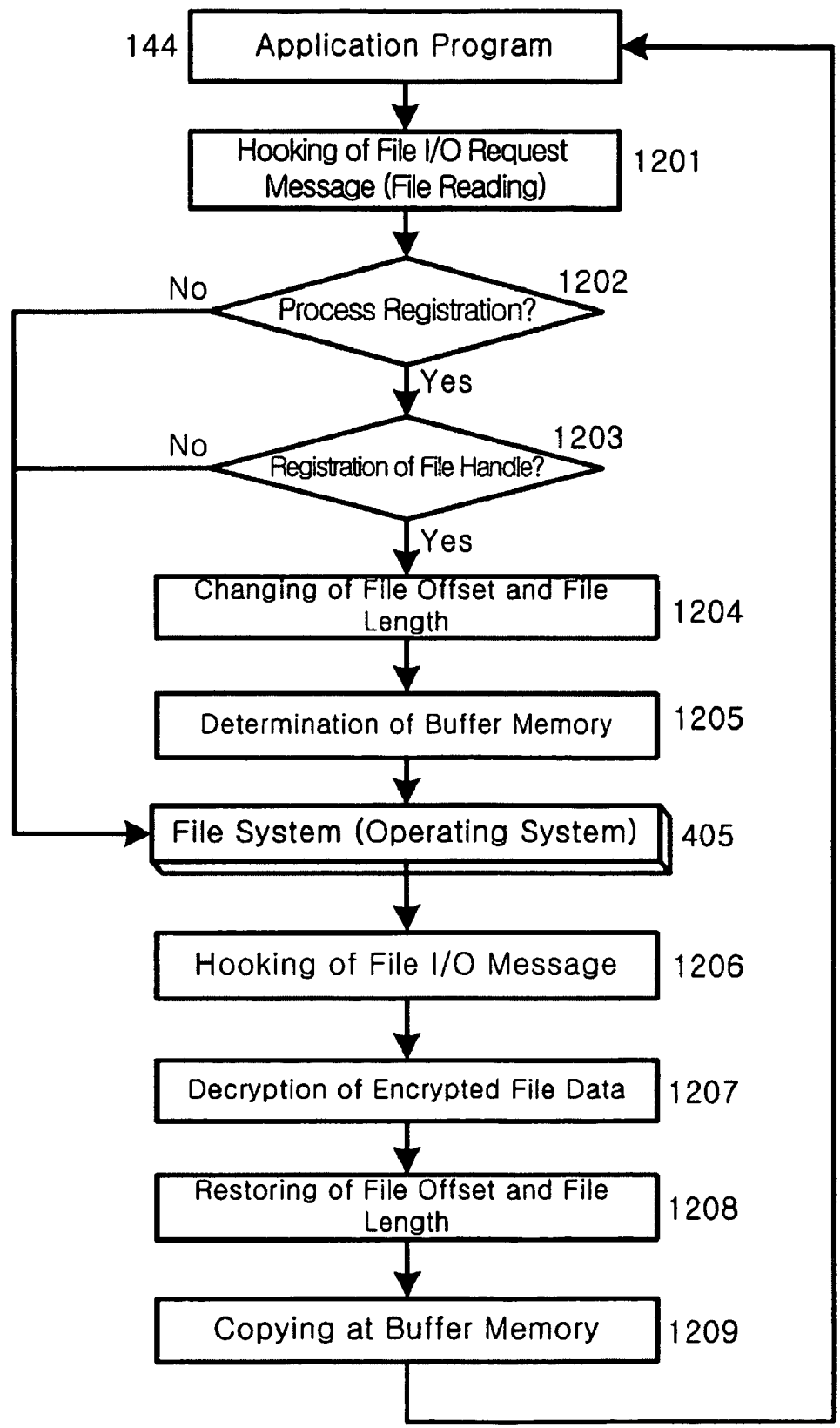
FIG. 12 is a flow chart of file read process of encrypted content package.

FIG. 12 is a flow chart of the read message of encrypted content package. If a read message is executed by application program 144, file filter driver 407 will hook a file I/O message and confirm whether the registration of PID of application program.

If the PID of application program is not registered, the read message is delivered to file system 405 since its message is related with general file. If the PID is registered, the confirmation process of file handle registration is followed as next process. This process is 1203.

If a file handle is not registered, the read message is delivered to file system. If a file handle is already registered, the requested file offset and file length by application program will be changed to the file offset and file length of proper encrypted block unit. This process is 1204. After that, the designation message of buffer memory is delivered to file system, which is needed for the decryption and restoration process of encrypted content data according to the changed file offset and file length. This process is 1205.

According to the changed file I/O message, changed file offset and file length of encrypted content data is loading on buffer memory and is decrypted at the unit of encrypted block using decryption key. This process is 1207. After decrypted content data is changed and restored to original file offset and file length requested by application program, which is delivered to application program after copy process at buffer memory using by application program. These processes are 1208 and 1209. Above filtering and decryption operation is executed repeatedly as real-time until a new file I/O message is delivered to the file filter driver. In this invention, application program 144 cannot distinguish the content data received from file system whether DRM adoption is executed or not. Above process is enabled by the hooking, changing and restoring of file offset and file length due to filtering operation of the file filter driver 407. In addition, a client system's user cannot hack or copy for the copyright infringement, since the encrypted data is only decrypted on volatile buffer memory and securely delivered to application program. As a result, main function of read message process is a changing, decrypting, and restoring of file offset and file length of encrypted data, based on the hooking of file I/O message by file filter driver 407.

Figure 13:
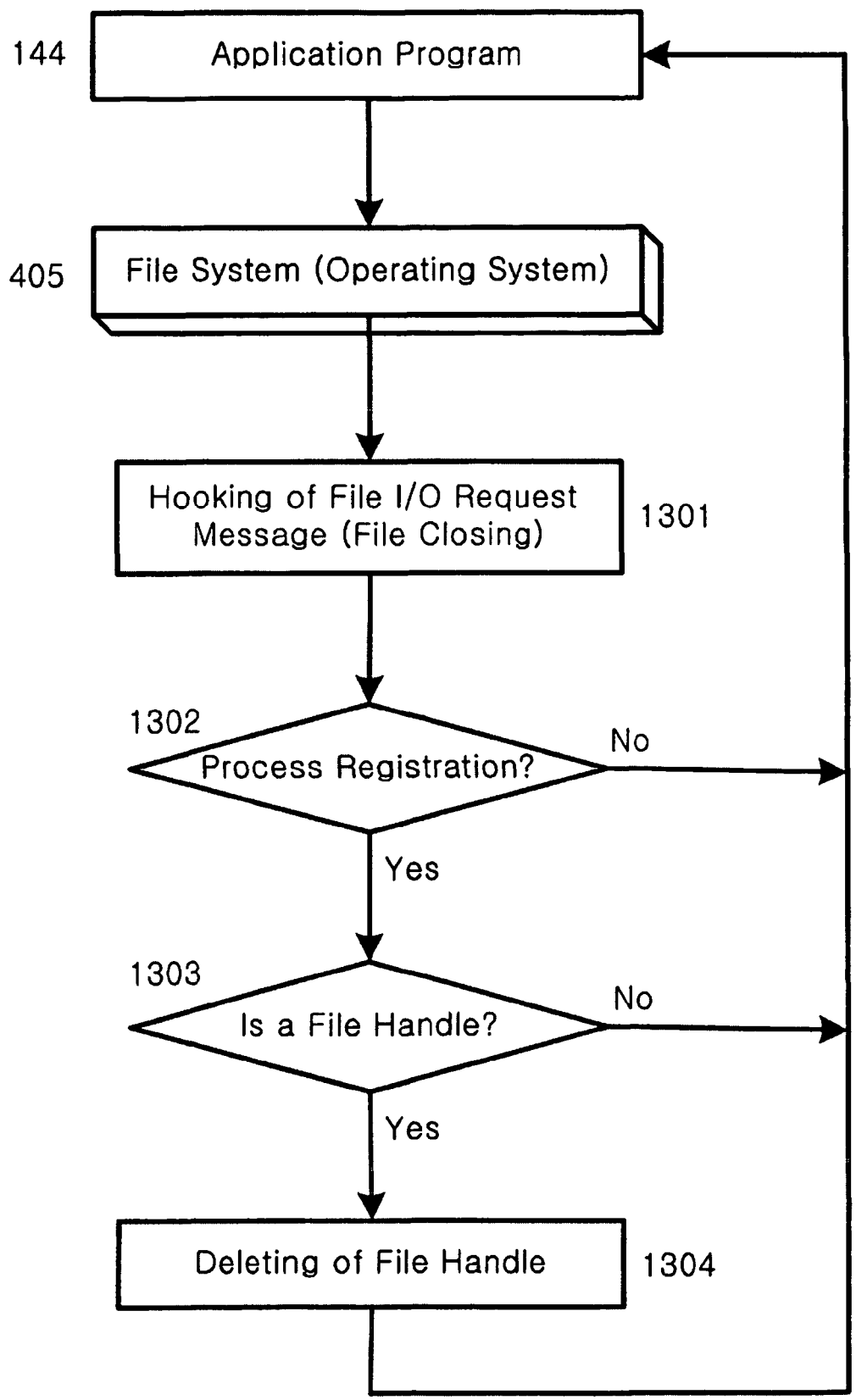
FIG. 13 is a flow chart of file close process of encrypted content package.

FIG. 13 is a flow chart of the close message of encrypted content package. If application program 144 delivers a close message to file system 405, file filter driver 407 will confirm whether PID of application is registered or not after the hooking of the file I/O message from file system to application program. These processes are 1301 and 1302. After that, if PID is already registered and the being of file handle is confirmed continuously, file filter driver will delete the file handle for the closing process of encrypted content file. These processes are 1303 and 1304. After closing process, the result of close message is delivered to application program 144.

Figure 14:
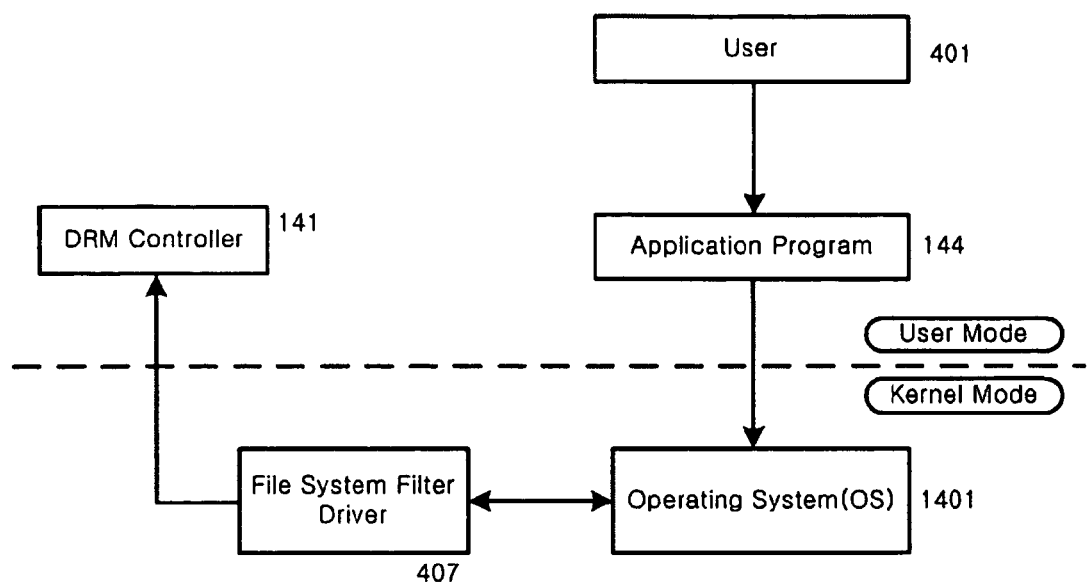
FIG. 14 is a block diagram of ending process of application program.

FIG. 14 is a block diagram of the end message of application program. If client system's user orders to end the application program, the end message is delivered to OS and file filter driver 407 detects the end message of the application. If the PID of application program is already registered on file filter driver 407, file filter driver will delete all data related with above PID such as file name and decryption key, etc. After that, if there is not a PID of application program on file filter driver 407, file filter driver will stop a filtering operation and close the application program after the transmission to DRM controller 141.

Figure 15:
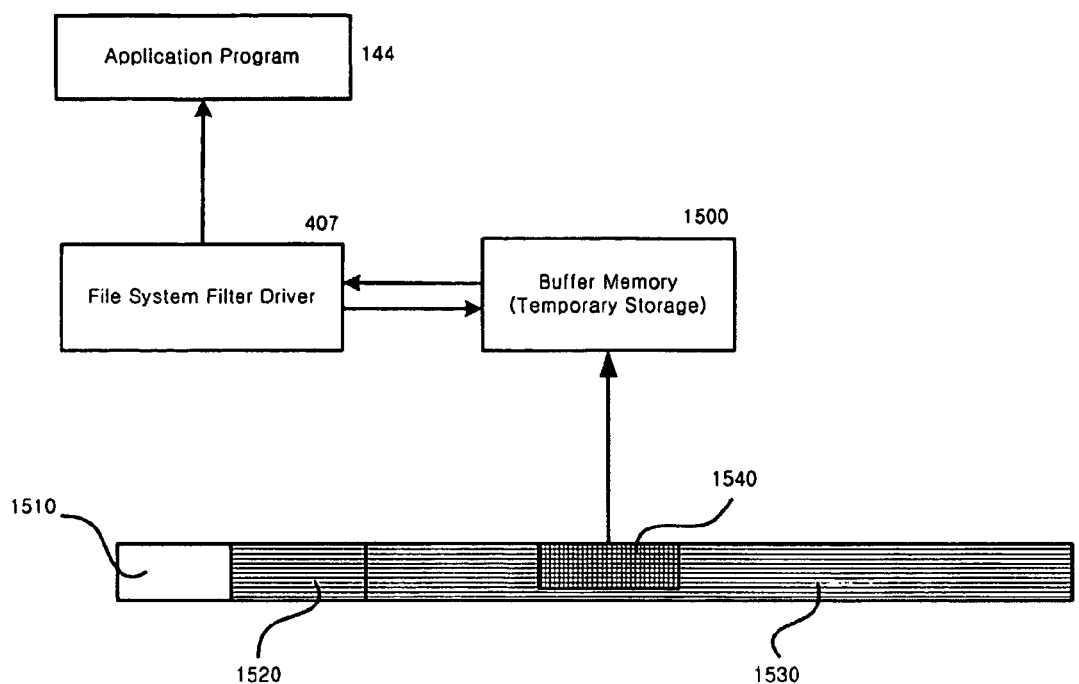
FIG. 15 is a block diagram of decrypting process of encrypted content package in download service.
Figure 16:
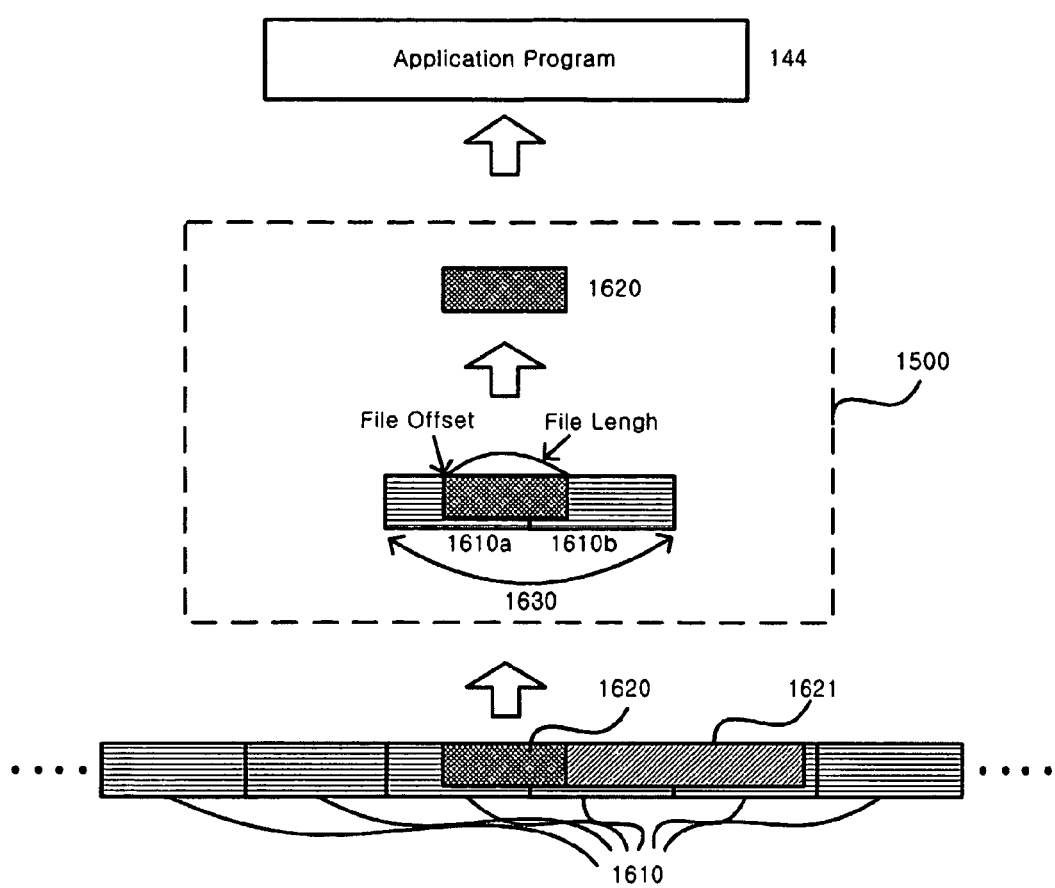
FIG. 16 is a block diagram of decrypting process and operating process for the change of file offset and length.

FIGS. 15-16 shows the decrypting and restoring processes of encrypted data, and transferring process of decrypted data to application program, which will be explained in detail as following.

FIG. 15 is a block diagram of the decrypting process of encrypted content package in download service. Generally digital content file is composed of file header 1520 and content data 1530. Original content with file header and content data is encrypted by specific encryption key for download service and DRM package header without encryption 1510 is additionally attached for various information of the DRM adoption. Different with streaming service, the file header may be preferably encrypted for efficient encryption and decryption in the case of download service. As mentioned in FIG. 10, if client system's user may select and click a specific content, DRM controller 141 is automatically activated and achieves various information of file name, file size, server information, content information, package version, etc. for decryption, by the analysis of DRM package header 1510.

FIG. 15 shows that the filtering operation of a hooking, changing, decrypting, and restoring of file offset and file length, and transferring the decrypted data to application program is executed by file filter driver 407. Encrypted content data 1540 of changed file offset and file length according to present encryption algorithm is delivered to designated buffer memory 1500 in advance for decryption process. File filter driver 407 decrypts the encrypted content data with changed file offset and file length by decryption key on buffer memory, and the decrypted content data is restored with original file offset and file length and delivered to application program.

FIG. 16 is a block diagram of the decrypting process and operating process for the change of file offset and length. In this invention, while the block unit of encryption and decryption is preferably determined 16 byte (128 bit) according to Rijndael encryption algorithm in the respect of efficiency and security, it is easily changed to different block unit or encryption algorithm for this DRM system. In the illustration, the size of one block 1610 is 16 byte and it is encrypted with 16 byte size. If original file offset and file size 1620 requested by application program is located at two data blocks 1610a and 1610b, new file offset and file length changed by file filter driver 407 will be included with 1610a and 1620b. Encrypted content data with changed file offset and file length from file system 405 is delivered to volatile buffer memory 1500 for decryption. After encrypted content data with changed file offset and file length is decrypted, file filter driver 407 will restore the decrypted content data block with original file offset and file length 1620, and will transfer the decrypted data block to application program 144. After that, arbitrary size of next data block 1621 requested by application program will be executed through the same process of previous data block 1620. These filtering process will be repeatedly proceeded until the end of content data or ending message by user.

As mentioned in FIG. 1, the decryption method is applied to content service of not only download method but also HTTP streaming since above decryption process is executed as real-time on volatile buffer memory of client system. It is one of features of this invention different with prior DRM technology since this can be more applied to HTTP streaming of simultaneous downloading and playing as well as download method.

Content service by HTTP streaming is preferably applied to a large storage capacity of content file such as online education, Internet movie, and Internet animation. In the case of HTTP streaming, content user does not need to wait a long time for download which is significant inconvenience for users. Additionally, content service by streaming does not need to buy new streaming server like expensive MMS(Microsoft windows Media Server) server because HTTP streaming is supported by general web server.

From now on, file format and DRM package header of content file will be explained in detail as well as license file format for DRM using FIGS. 17-20.

Representative and popular file format for multimedia service in the world is ASF(Advanced Streaming Format). ASF is data format for efficient transmission and reception of message manufactured by Microsoft, in which it may define and support a partition of multimedia file, configuration of data packet, and transmission rules for streaming.

ASF file may contain a lot of objects, representatively such as header object, data object, index object, and other objects. The header object is composed of file properties object, lots of stream properties object, other header object, etc. Besides each object is composed of object ID with 16 byte, object size with 8 byte, object data with arbitrary size. ASF file is easily supported to adjust of replay timing and synchronization, and one of features is independent upon lower protocol. If client system request a data transmission to external streaming server, the server may check the environment of protocol of multicast IP, UDP, RTP, TCP, HTTP one by one and select automatically the most efficient protocol. In the worst case, multimedia content service can be executed by HTTP streaming through the web without specific configuration change.

MMS protocol is most popular protocol for multimedia streaming, which is designed and dynamically connected with web browser program of Internet Explorer and linked with Windows Media Player, for the purpose of best streaming quality. MMS protocol is one of media server protocol and more secure and stable for streaming service than HTTP protocol of basic Internet protocol. If the transmission request of content data is generated in client system, MMS may select one of HTTP, UDP, and TCP protocols for highly efficient streaming.

Figure 17:
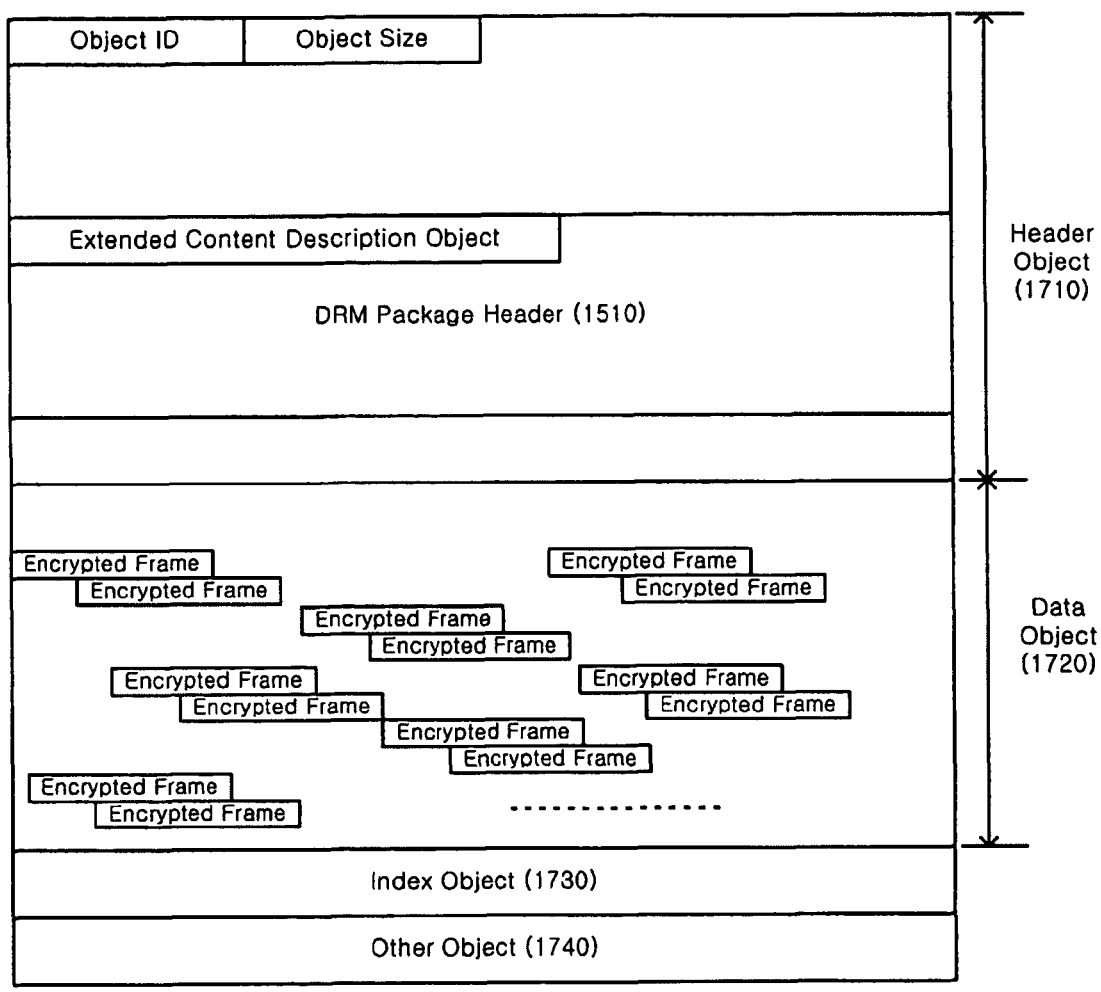
FIG. 17 is a schematic diagram of file format for streaming service.

FIG. 17 is a schematic diagram of the file format for streaming service. As mentioned above, ASF file format is composed of header object 1710, data object 1730, and other object 1740. In this invention, DRM package header 1510 can preferably be included in extended content description object which is an additional object for new data insertion.

For the encryption of streaming content, it may be preferably to encrypt not header object 1710 but data object 1720. As mentioned above, header object is useful control information communicated between application program of client system and external streaming server. It is a special feature of this invention which can be supported for the DRM system without any change of hardware system and additional overload of network traffic. Since control information of the header object 1710 is freely communicated between application program and external streaming server, streaming service is almost same before and after DRM adoption. But encrypted data object 1720 must be decrypted as real-time by network filter driver 404 and be delivering to application program 144.

Additionally data object 1720 can be executed as a whole encryption or as a part encryption for efficient encryption. When it is encrypted as a part, specific data frames of data object must be selected in advance. There are lots of data unit in data object 1720 of ASF file format, and data frames of sound and video are included in a multimedia segment.

Therefore it must be supported to select proper key frames of sound and video for the partial encryption of data object 1720. Since the key frame of sound and video has a specific identifier for the position recognition, a partial encryption and decryption is easily realized by computer program. Since information of encryption method is preferably included in DRM package header 1510, encrypted content may be decrypted as a whole or a partial decryption according to the information of encryption method. If encrypted key frame is not sound but video after DRM adoption, unauthorized user can hear the sound clearly but can not see the video part of multimedia content, just like the scrambling technology of cable or satellite broadcasting.

Figure 18:
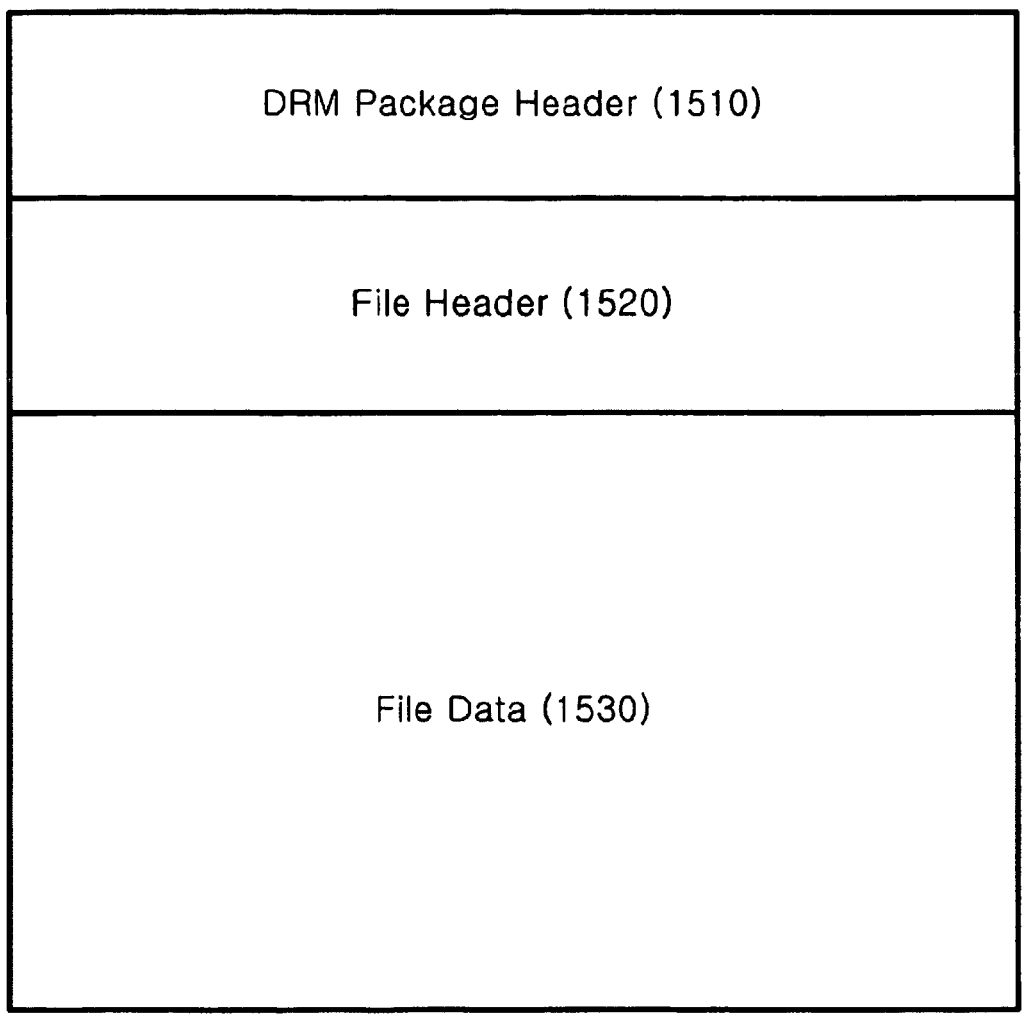
FIG. 18 is a schematic diagram of file format for download service.

FIG. 18 is a schematic diagram of the file format for download service. Unlike streaming service, file header 1520 and file data 1530 for download service may be generally executed as a whole encryption and DRM package header 1510 without encryption is preferably included in the front of multimedia file. However encrypted content package for download service may be generated by whole encryption or partial encryption similar with streaming service. Partial encryption can be executed by specific sound or video region and, in addition, partial region of total content file like movie preview content.

In this invention, encryption is performed using by Rijndael encryption algorithm, which is recently popular encryption method. Rijndael is a block cipher, designed by Joan Daemen and Vincent Rijmen as a candidate algorithm for AES (Advanced Encryption Standard). The cipher has a variable block and key length of 128, 192, or 256 bits to encrypt blocks with a length of 128, 192, or 256 bits.

Rijndael is known as higher security, performance, efficiency, and applicability for encryption than other encryption algorithm. Although encryption with 16 byte (128 bit) is executed in this invention, Rijndael encryption with different byte or different encryption algorithm may easily be applied for encryption.

Additionally encryption with multiple keys can be used instead of encryption with one key for high security of digital content. For example, if the file size of digital content is 50 mega bytes, encryption may be executed by one key per each 10 mega byte and therefore encrypted with 5 encryption keys. The encryption method and key information may be included in DRM package header or license file package for proper decryption.

FIG. 19 is a schematic diagram of the header format of DRM package. As mentioned above, DRM package header 1510 may be generally included in encrypted content package 142 for streaming or download service. DRM package header may have various information, such as version number of package, content URI length, content type length, content URI, content type, header length, data length, encryption method, rights issuer URL, content name, content description, content vender, icon URI, digital signature, content server URL, and so on. Various information included in DRM package header is such as content package information of original and encrypted content, encryption method and information, URL information of license issuer, digital signature, URL information of content server, and so on, for smooth and efficient content service. Above URI is an abbreviation of uniform resource identifier and resource information with various types may be treated using same methodology of URI.

If DRM package header 1510 is unified and standardized, consistent content service can be executed for both streaming and download method. In addition, unified content distribution platform with DRM adoption can support various client system, for example PC, Notebook, PDA, cellular phone, digital TV, telematics devices, etc with wire or wireless connection. Encrypted content package may be preferably separated with license package, which can support lots of business model for content service and high efficient system for content distribution. The separation of encrypted content package and license package can support for so called "one package, multiple use".

FIG. 20 is a schematic diagram of the file format of license package. As mentioned above, license file may be issued by DRM license issuer 133 after the authentication process of user and application program by DRM server 130. License file is delivered as encrypted license package from DRM server to client system. There are various information in license package, such as license separator, license version, authentication success flag, arbitrary message, license flag, start date, end date, total count and current count of content usage, total print, total and current number of allowed PC, total index of decryption key, current index of decryption key, decryption key, URL of hardware information collection, and so on. The license package for usage rights and decryption key can be easily customized according to request of content provider.

The start date and end date may be used for illegal usage protection through the usage record of last use, which can be recorded as encrypted type in the registry of client system. The count number of usage may be automatically checked by client system's counter and the number of allowed PC can be controlled by authentication process of hardware information such as specific serial number of CPU, HDD, LAN card, mac address, etc. The authentication of hardware information may be activating a proper usage without illegal usage.

Figure 21:
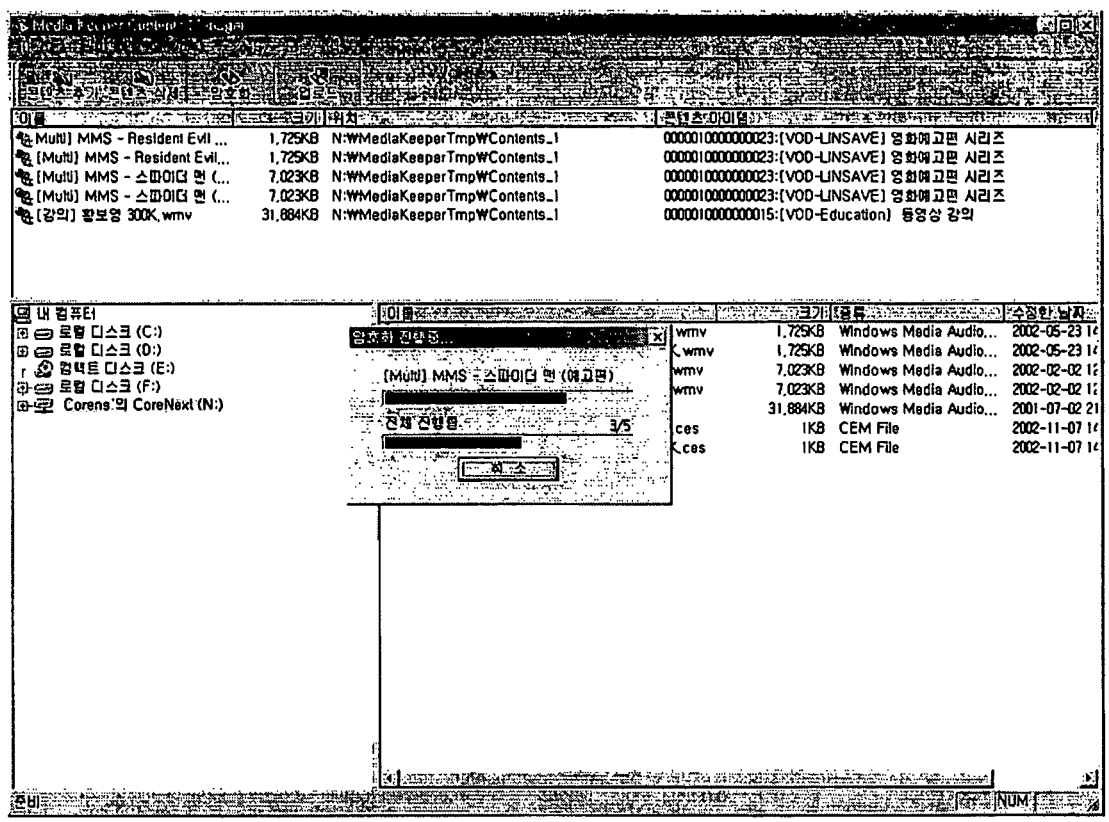
FIG. 21 is a picture image of content packager program for the encryption of original content.

FIG. 21 is a picture image of the content packager program for the encryption of original content. As mentioned above, Content packager 112 as computer program may encrypt the original content using encryption key received from DRM server component 132. Encryption can be executed as unit of file or directory, and content packager may have various function of content addition, content deletion, encryption, upload to content server 122, and so on. Additionally function menu of file, live streaming, view, option, help message may be furnished, which can configure various parameters for encryption.

Using content packager, encrypted content package 121 must be produced in advance and uploaded to content server 122 for VOD streaming and download service. In the case of live streaming service, content packager 112 must encrypt multimedia content data received from output of encoding system, as real-time encryption, using network filter driver. The encryption of live content is executed before transferring to streaming server. The content packager may have a function menu for live streaming.

Figure 22:
FIG. 22 is a picture image of DRM administrator program for the configuration of the various parameters of DRM server.

FIG. 22 is a picture image of the DRM administrator program for configurating the various parameters of DRM server. DRM administrator 134 as computer program may have various menus for management and configuration of content service, such as member's ID, member's name, social identification number, telephone number, security level configuration of content, management of content service site, license management, management of user's hardware information, management of log statistics, and so on. These function menu can be easily changed for request of content provider and DRM administrator 134 may be serviced remotely through internet web site.

Figure 23:
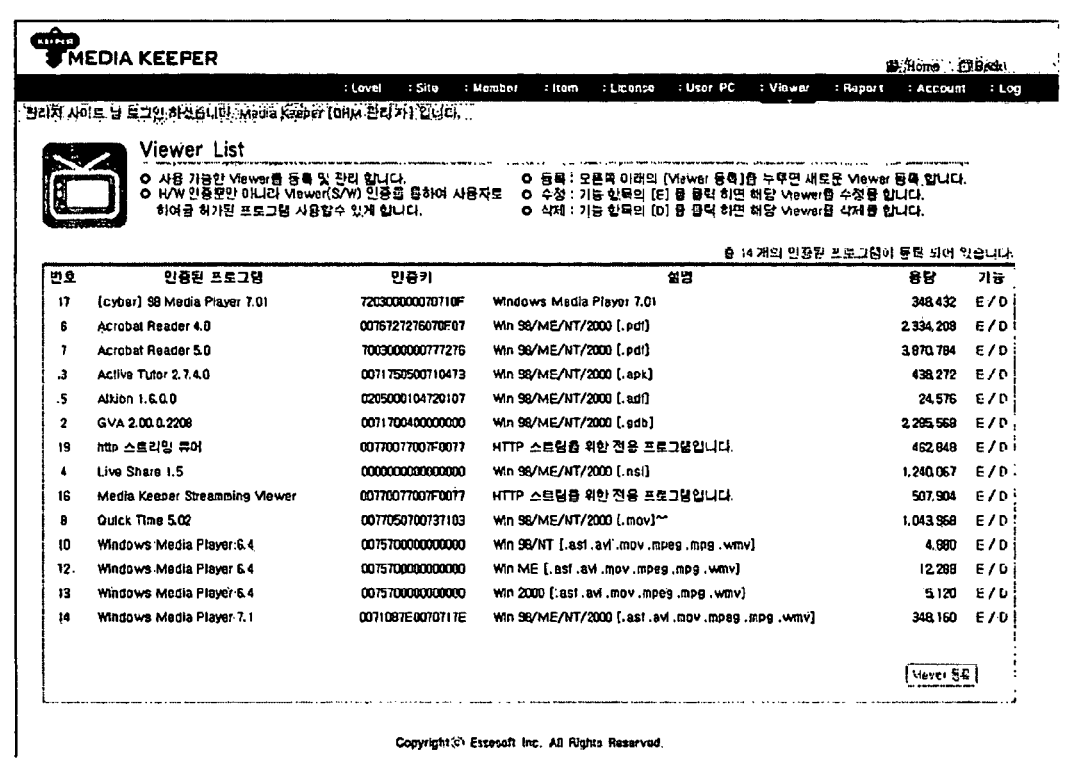

FIG. 23 is a picture image of the registrating function of viewer programs in DRM administrator program. If content provider selects viewer menu on DRM administrator 134, the list of authenticated viewer program for content service will be displayed. Referred to image, viewer list registered on DRM server is such as Windows Media Player 7.01, Acrobat Reader 4.0, Active Tutor, Alkion, GVA, HTTP Streaming viewer, Live Share, Quick Time Player, etc. Therefore application program without registration at DRM server is not allowed for content protection, since there are high dangers of hacking or unauthorized copy of digital content. In addition, it is very convenient to register and manage the viewer list on DRM server. Addition of new program can be easily executed by simple registration process.

By using unique idea of this invention, DRM may be applied to most of existent application programs, such as general document programs (Korean word processor of Hangul, Microsoft word, Korean word processor of Hoonminjeongeum, etc.), Microsoft office programs (Powerpoint, Excel, Access, etc.), Windows Media Player, and general application programs of image viewer, online education, music, flash, etc. Though most of application programs can be easily registered, several application programs like GVA, a program for online education in Korea, must be specially treated by DRM system. Because GVA has a check function of file size, DRM controller of client system must have an additional compensation function for different file size.

If content provider selects a 'viewer registration' menu on DRM administrator 134, content provider can easily register new application program as viewer. On the image of viewer registration, there is various information of viewer program, such as number, name of registered program, registration key, description, file size, function, etc. The registration key for application program can be easily generated with many different methods.

In order to authenticate an application program of client system, DRM controller 141 of client system will send to DRM server 130 the result of generation of registration key and check of file size. After that, DRM server 130 will transfer the message of success or fail to client system after comparison process of registration key and file size.

If application program for content play is not installed yet in client system, DRM server 130 will transfer the fail message for authentication of application program and client system's user must installed the application program in advance.

After authentication of application program, next step is an authentication of client system's user and the order of both authentications may be altered in other way round. One of superior features of this invention is a using existent viewer program without specific viewer program and a simple registration of application program for encrypted content play.

Figure 24:
FIG. 24 is a picture image of decrypting and playing of encrypted VOD streaming content using a general viewer program, not a specific program for DRM.

FIG. 24 is a picture image of the decrypting and playing of encrypted VOD streaming content using a general viewer program, not a specific program for DRM. This picture image is a content play with general Windows Media Player of not downloaded in client system but VOD streaming from external streaming server 122*a*. It is shown that encrypted content data is delivered into client system and filtered by network filter driver 404 for filtering operation, which is explained above in detail. Up to now, the most difficult problem for commercialization of DRM system is a using of specific viewer program for DRM. Therefore it is certain to play the encrypted content data using existent general application program without specific viewer program for DRM system.

Figure 25:
FIG. 25 is a picture image of decrypting and playing of encrypted VOD streaming content using a OCX player.

FIG. 25 is a picture image of the decrypting and playing of encrypted VOD streaming content using an OCX player. Recently OCX player like this is very popular for content service such as Internet Theater or online education company. OCX (OLE custom control, OLE: Object Linking and Embedding) player is not a specific viewer program but an existent program linked with various components of Windows Media Player. Therefore OCX player with various design or function can be easily constructed into Explorer web browser program. This picture image of OCX player is also VOD streaming service of encrypted content data which is the same process of above VOD streaming using Windows Media Player.

Figure 26:
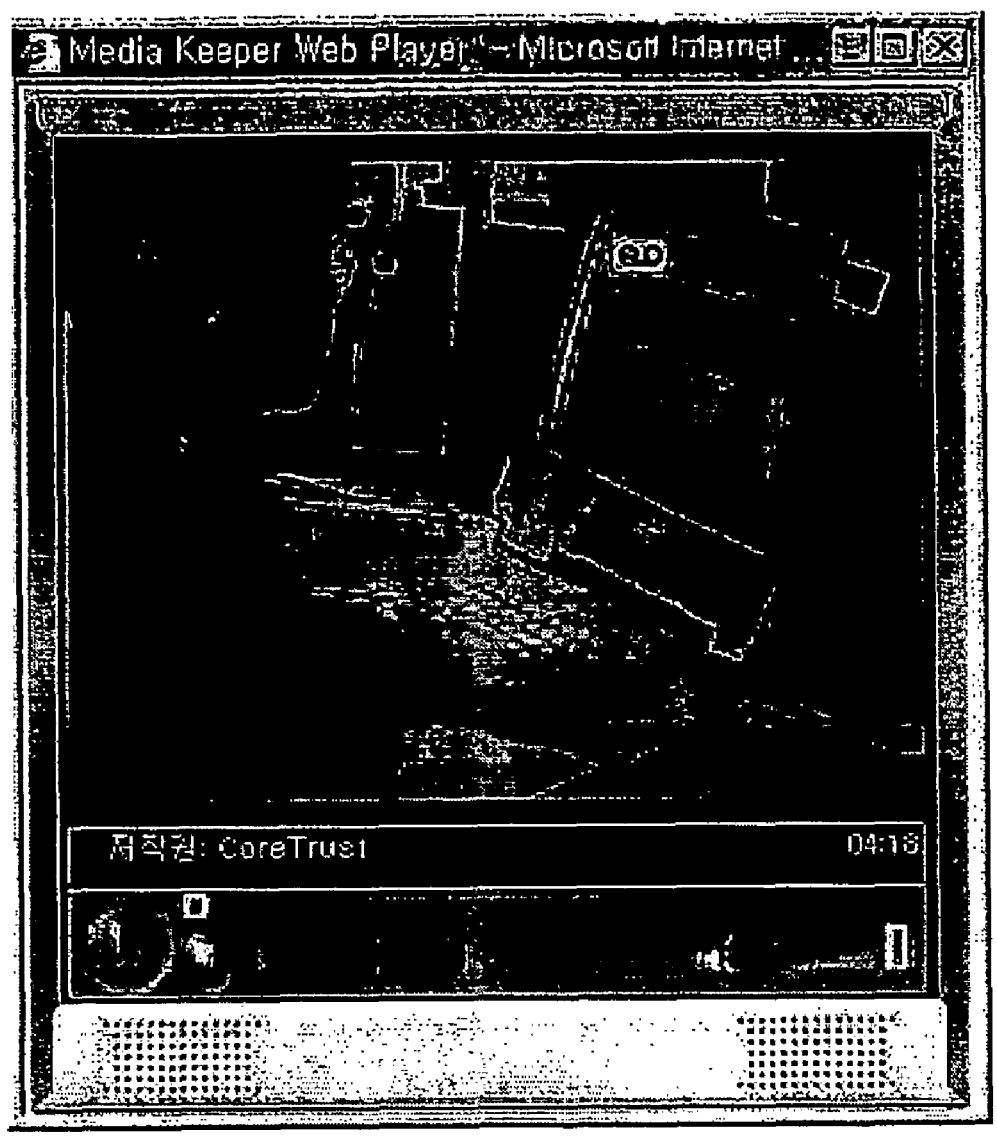
FIG. 26 is a picture image of decrypting and playing of encrypted live streaming content using a OCX player.

FIG. 26 is a picture image of the decrypting and playing of encrypted live streaming content using an OCX player. For live streaming service, there is needed to set up a video camera and encoding server system in advance. This picture image is a general view of Coretrust Inc. office, which is taken a picture by video camera and encoded with Microsoft Encoding Server. After that, encoded sound and video data will be encrypted by network filter driver of encoding system as real-time, before transmission to external streaming server 122a. After client system 140 receives encrypted content package from streaming server, encrypted content data of live streaming is decrypted as real-time by network filter driver and is played with OCX player through filtering operation which is explained above in detail.

Figure 27:
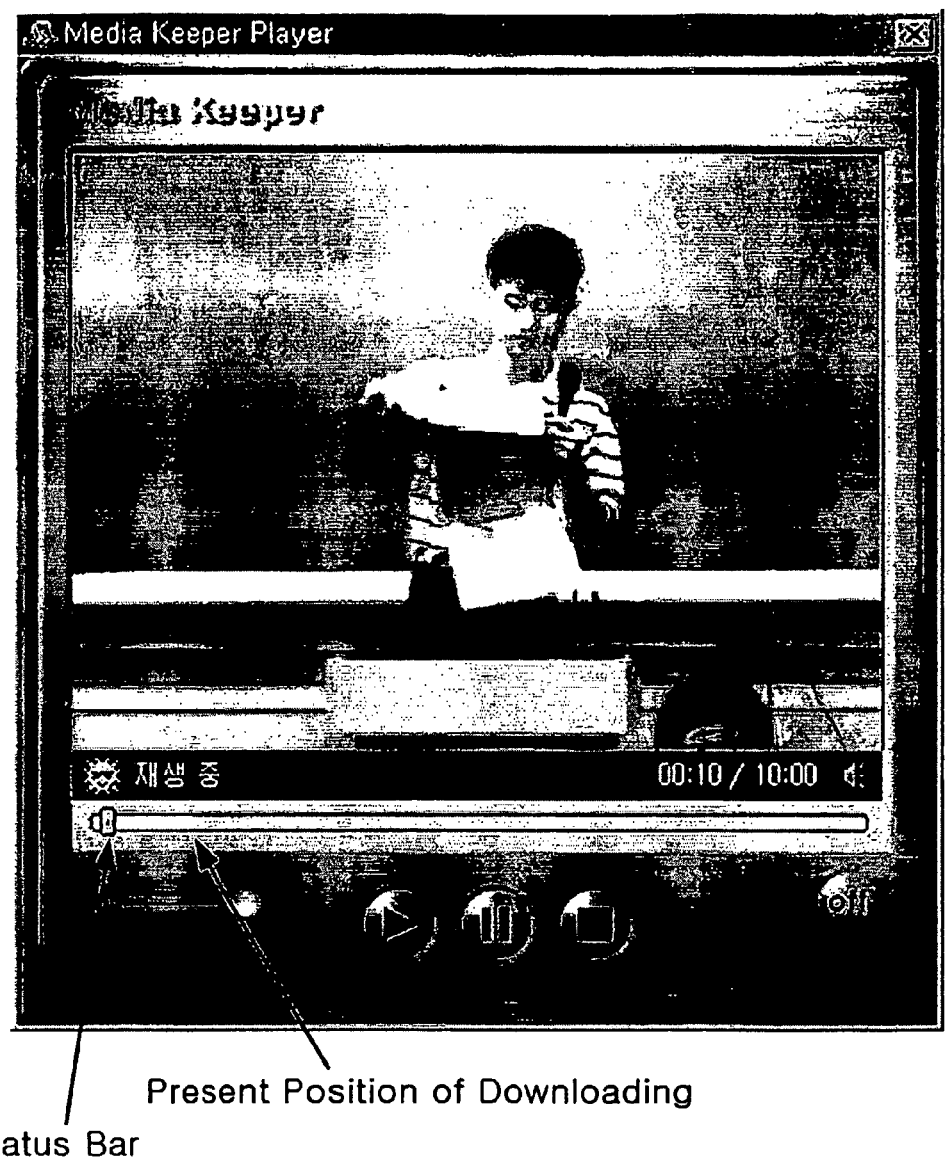
FIG. 27 is a picture image of decrypting and playing of encrypted content received by HTTP streaming service.

FIG. 27 is a picture image of the decrypting and playing of encrypted content received by HTTP streaming service. In this picture image, encrypted content package 142 is delivered to client system 140 using HTTP protocol from web server. After that, DRM controller 141 and file filter driver 407 will be activated for content play with HTTP streaming method. Encrypted content package is simultaneously stored and played by HTTP streaming. In the picture image, the relative white region on the below part of HTTP streaming viewer is meant as the indicator of download and small rectangle bar is a status of streaming position. Therefore it is shown that encrypted content package of external web server 122b can be played as well as download process by HTTP streaming. As not shown in this invention, the content play by download method will be easily executed using the same style of HTTP streaming method.

Figure 28:
FIG. 28 is a picture image of playing not the decrypted content but the encrypted.

FIG. 28 is a picture image of playing not decrypted but encrypted content because of fail authentication. This picture image is the broken playing without decryption process, since client system's user does not pass through authentication process and network filter driver does not filtering operation for decryption. As mentioned above, the broken state of content play can be controlled according to a whole or a partial encryption. For example, content play of broken image without sound may be possible by control of encryption method, just like scrambling function of cable or satellite broadcasting.

This invention may not be limited to embodiments and drawings which are explained in detail since the considerable modifications, change and adaptation by those skilled in the art may easily be executed in many ways without departing from the spirit and scope of the invention.

INDUSTRIAL APPLICABILITY

In this invention, a method, system, and computer program for information protection of digital content such as animation, movie, sound, and online education delivered by streaming or download method through wire or wireless internet, for the purpose of perfect protection of copyright infringement.

In addition, encrypted content package can be viewed or played by existent viewer or player program without using specific viewer program for DRM, since network and file filter driver executes a filtering operation of a hooking, changing, and decrypting of message and data packet between application program and device driver in kernel, and transferring the decrypted content data to application program.

Additionally this invention can propose new unified DRM system of wire and wireless environment for secure content distribution, since the core technology of this invention can easily be applied to various client system devices such as PC, Notebook, PDA, cellular phone, set-top box through a software program or a hardware chip.

This invention suggests a new DRM system, which can support the existent file format and network protocol, without additional generation of network traffic or server overload after DRM adoption. It is easily applicable to most of present commercialized or now developing file format for this DRM system.

It is understood, therefore, that the present invention is susceptible to many different variations and combinations and is not limited to the specific embodiment shown in this application. In addition, it should be understood that each of the segments disclosed in the various embodiments all do not need to be provided in a single embodiment, but rather can be provided in any desired combination of segments where desired. It will also be appreciated that a system in accordance with the invention can be constructed in whole or in part from special purpose hardware or from conventional general purpose computer hardware or any combination thereof, any portion of which may be controlled by a suitable program. Any program may in whole or in part comprise part of or be stored on a system in a conventional manner, or remain whole or in part be provided into the system over a network or other mechanism for transferring information in a conventional manner. Accordingly, it is understood that the above description of the present invention is susceptible to considerable modifications, change and adaptation by those skilled in the art, and that such modifications, changes and adaptation by those skilled in the art, and that such modifications, changes and adaptations are intended to be considered within the scope of the present invention, which is set forth by the appended claims. The invention having been described, it will be apparent to those skilled in the art that the same may be varied in many ways without departing from the spirit and scope of the invention. Any and all such modifications are intended to be included within the scope of the following claims.

The invention claimed is:

1. A multimedia contents protecting system for preventing multimedia contents, which are sent to an application program running on a client system, from leaking without permission through the use of an information providing system and the client system, the information providing system and the client system each having a Central Processing Unit (CPU), a volatile storage (memory), a non-volatile storage (hard disk) and an input/output device (keyboard, monitor, etc.), and being connected to each other through wired or wireless internal communication means or means for communicating with an external network, comprising:

the information providing system comprising, encryption means (110) for encrypting original contents using one or more encryption keys and generating an encrypted contents package (121), provision means (120) for holding the encrypted contents package (121) and providing the encrypted contents package (121) to users on line, and a Digital Rights Management (DRM) server (130) for managing generation of the encryption keys and performing various authentication operations; and the client system comprising, filtering means located between an application program (144) on a higher layer and a device driver on a lower layer for repeating a process of hooking data packet of the encrypted contents package (121) with messages between the application program and the device driver, converting the data packet to a format corresponding to decryption, decrypting the encrypted data packet using one or more decryption keys, and sending the decrypted data packet to the application program, control means for starting and terminating the application program and controlling the filtering means, and an application program (144) for receiving the contents from the filtering means and playing the contents.

2. The multimedia contents protecting system as set forth in claim 1, wherein the encryption means (110) is a contents packager (112) that receives the encryption keys generated by the DRM server (130) and encrypts the contents.

3. The multimedia contents protecting system as set forth in claim 1, wherein the provision means (120) is a contents server (122) to which the contents package (121) encrypted by the encryption means (110) is uploaded, and the contents server (122) is a streaming server (122a) that provides the encrypted contents in a streaming manner, a Web server (122b) that allows the encrypted contents to be selected or being provided to a download service, or a File Transfer Protocol (FTP) server.

4. The multimedia contents protecting system as set forth in claim 1, wherein the DRM server (130) comprises:

a DRM server DataBase (DB) (131) for storing various data including contents information, the encryption keys, user information and application program information of the DRM server (130);

a DRM server component (132) for controlling management of generation of the encryption keys and issuance of licenses;

a DRM license issuer (133) for issuing an encrypted license package in response to a request from the control means of the client system; and a DRM administrator (134) for performing various setting and administration of the DRM server.

5. The multimedia contents protecting system as set forth in claim 1, wherein the information providing system further comprises connecting means for enabling a connection to a billing server (150) or payment gateway server (160) to bill users for pay services.

6. The multimedia contents protecting system as set forth in claim 1, wherein the filtering means performs a filtering operation in kernel mode in response to an instruction of the control means, and comprises a network filter driver (404) to which a network driver (403) is connected, or file filter driver (407) that converts and restores a file offset and a file length message requested by the application program (144) with respect to the file system (405).

7. The multimedia contents protecting system as set forth in claim 1, wherein the control means is a DRM controller (141) that is automatically activated to initiate the application program (144) when a user selects contents in the provision means (120) in the case of a streaming manner or when a user issues a command to open contents downloaded to a non-volatile storage in the case of a downloading manner, accesses the DRM server (130) to allow the contents and the user to be authenticated and receive the license package (143) including decryption key, terminates the filtering operation depending on termination of the application program (144), and controls the filtering means.

8. The multimedia contents protecting system as set forth in claim 1, wherein the application program (144) is not a dedicated viewer program having a function of decrypting the contents package, but a general application program capable of playing data in format of the contents package.

9. The multimedia contents protecting system as set forth in claim 1, wherein the client system further comprises storage means that revises or edits contents that the application program (144) have decrypted and read in, and encrypts and stores the revised or edited contents, and the filtering means further comprises an encryption means for encrypting the contents.

10. The multimedia contents protecting system as set forth in claim 1, wherein the filtering means is located on an uppermost end of layers of the device driver in a direction toward the application program (144).

11. The multimedia contents protecting system as set forth in claim 6, wherein the network filter driver (404) uses a Transmission Control Protocol (TCP), or User Diagram Protocol (UDP) further having a function of correcting received data.

12. The multimedia contents protecting system as set forth in any of claims 1 to 11, wherein the client system (140) further comprises storage means for storing a continuous contents packets which are downloaded during transferring and playing the continuous contents packets in the case of a streaming manner.

13. The multimedia contents protecting system as set forth in any of claims 1 to 11, wherein the encrypted contents package (121) is transferred in one of a Video On Demand (VOD) streaming manner, a real-time live streaming manner, a complete downloading manner and a Hyper Text Transfer Protocol (HTTP) streaming manner, or off line in a storage medium, such as Compact Disk (CD) or Digital Versatile Disk (DVD).

14. The multimedia contents protecting system as set forth in claim 13, wherein the transferring is performed in a real-time live streaming manner, and the original contents are input through a multimedia receiving device and a encoding system, and the encrypted contents are transferred to the provision means (120) through the network driver of the encoding system, and the encoding system further comprises a network filter driver disposed upstream of the network driver for generating the encrypted contents through real-time hooking and encryption with respect to the original contents.

15. The multimedia contents protecting system as set forth in claim 1, wherein the encrypted contents package (142) comprises at least a data object portion that are encrypted contents (142a) and a header object portion that are non-encrypted meta data (142b).

16. The multimedia contents protecting system as set forth in claim 15, wherein the header object portion comprises a DRM package header for recording information on contents and encryption of the encrypted contents package (142).

17. The multimedia contents protecting system as set forth in claim 16, wherein the DRM package header includes one or more information of a version number, a contents Uniform Resource Identifier (URI) length, a contents type length, a contents URI, a contents type, a header length, a data length, an encryption method, a rights issuer Uniform Resource Locator (URL), a contents name, a contents description, a contents vendor, an icon URI, a digital signature, and a contents server URL.

18. The multimedia contents protecting system as set forth in claim 15, wherein the data object portion is fully encrypted or partially encrypted in predetermined portion on frame basis.

19. The multimedia contents protecting system as set forth in claim 1, wherein the client system further comprises storing means for storing the encrypted contents package to a non-volatile storage means.

20. The multimedia contents protecting system as set forth in claim 1, wherein the control means receives encrypted license package (143) from the DRM server (130) in response to a request for authentication, and the encrypted license package (143) comprises:
   a decryption key (143a) portion for being used in decryption of the encrypted contents package; and
   usage authority information (143b) portion including at least a count of use and a period of use of the contents and terminal restriction information.

21. A multimedia contents protecting method of preventing multimedia contents, which are sent to an application program running on a client system, from leaking without permission through the use of an information providing system and the client system, the information providing system and the client system each having a CPU, a volatile storage (memory), a non-volatile storage (hard disk) and an input/output device (keyboard, monitor, etc.), and being connected to each other through wired or wireless internal communication means or means for communicating with an external network, comprising:
   an encrypting and uploading step of an encrypted contents package (121) converted from an original contents (111) using encryption keys being uploaded to the information providing system through the communication means;
   an initiating and connecting step of the client system being connected to the information providing system to initiate streaming or downloading service by selection of encrypted contents package (121) in the information providing system using the input device of the client system;
   a decrypting and playing step of the client system making the encrypted data played through the output device by the application program (144), by a filtering operation repeating a process of hooking data packet of the encrypted contents package (121) with messages between the application program (144) on a higher layer and the device driver on a lower layer, converting the data packet to a format corresponding to decryption, decrypting the encrypted data packet using one or more decryption keys, and sending the decrypted data packet to the application program, during transferring in the case of a streaming manner, or in response to a play signal after downloading in the case of a downloading manner; and
   a terminating step of the client system terminating the operation of the application program (144) and the filtering operation and disconnecting connection to the information providing system in the case of a streaming manner, when a termination command of the application program (144) is detected.

22. The multimedia contents protecting method as set forth in claim 21, wherein the information providing system comprises
   encryption means (110) for encrypting original contents using one or more encryption keys and generating a encrypted contents package (121),
   provision means (120) for holding the encrypted contents package (121) and providing the encrypted contents package (121) to users on line, and
   a Digital Rights Management (DRM) server (130) for managing generation of the encryption keys and performing various authentication operations; and
   the encrypting and uploading step comprises:
   a step of the encryption means (110) requesting (S21) and obtaining (S22) an authentication with respect to the DRM server (130);
   a step of the encryption means (110) requesting (S23) and obtaining (S24) one or more encryption keys with respect to the DRM server (130);
   a step of the encryption means (110) encrypting an original contents using the encryption keys;
   a step of the encryption means (110) requesting (S25) and obtaining (S26) an authentication with respect to the provision means (120); and
   a step of the encryption means (110) sending (S27) the encrypted contents package (121) to the (122) provision means (120).

23. The multimedia contents protecting method as set forth in claim 21, wherein
   the information providing system comprises
   encryption means (110) for encrypting original contents using one or more encryption keys and generating a encrypted contents package (121),
   provision means (120) for holding the encrypted contents package (121) and providing the encrypted contents package (121) to users on line, and
   a Digital Rights Management (DRM) server (130) for managing generation of the encryption keys and performing various authentication operations; and
   the initiating and connecting step comprises:
   a step of the provision means (120) sending (S31) contents identification information and user identification information to the client system, when an open command of the application program (144) is issued with respect to the encrypted contents package (121) after download completed in the case of a downloading manner, or when the contents in the provision means (120) are selected in the case of a streaming manner;
   a step of the client system requesting (S32) contents and user authentication and receiving (S33) license authentication including one or more decryption keys and usage authority information with respect to the DRM server (130);
   a step of the client system sending (S34) to the application program (144), an URL of the provision means (120) in the case of a streaming manner, a position of the non-volatile storage device where the contents are stored in the case of a complete downloading manner, and both the URL of the provision means (120) and the position of the non-volatile storage device in the case of a HTTP streaming manner, after initiating the application program (144); and
   a step of the client system requesting (S35) the contents data, to the provision means (120) in the case of a streaming manner, to the file system in the case of a downloading manner, and to both the provision means (120) and the file system in the case of a HTTP streaming manner.

24. The multimedia contents protecting method as set forth in claim 23, further comprising:
   a connection preparing step of examination of a handler and registration of a process being performed after the initiation of the application program (144) by the client system; and
   a connecting step of registration of a next process and ascertainment and storing of a remote port being performed.

25. The multimedia contents protecting method as set forth in claim 24, wherein the client system comprises filtering means located between an application program (144) on a higher layer and a device driver on a lower layer for performing a filtering operation repeating a process of hooking data packet of the encrypted contents package (121) with messages between the application program and the device driver, converting the data packet to a format corresponding to decryption, decrypting the encrypted data packet using one or more decryption keys, and sending the decrypted data packet to the application program, and
   the connection preparing step comprises:
   a step of the application program (144) being temporarily stopped after initiation;
   a step of the handler being determined whether zero or not by a message between the application program (144) and the device driver hooked by the filtering means;
   a step of the message being sent to the device driver after deletion of an address handle to cancel connection if the handler is zero, and a process being determined whether registered in the filtering means or not if the handler is not zero;
   a step of the message being sent to the device driver as it is if the process is not registered, and a changed message being sent to the device driver after an address handle being registered, my event handler being set, and a local port being stored if the process is registered; and
   a step of the application program (144) receiving a ready message from the device driver by sending the message.

26. The multimedia contents protecting method as set forth in claim 24, wherein
   the client system comprises filtering means located between an application program (144) on a higher layer and a device driver on a lower layer for performing a filtering operation repeating a process of hooking data packet of the encrypted contents package (121) with messages between the application program and the device driver, converting the data packet to a format corresponding to decryption, decrypting the encrypted data packet using one or more decryption keys, and sending the decrypted data packet to the application program, and
   the connecting step comprises:
   a step of a process being determined (801) whether registered in the filtering means or not by a message between the application program (144) and the device driver hooked by the filtering means;
   a step of the message being sent to the device driver as it is if the process is not registered, and the number of the remote port being determined whether a predetermined number or not if the process is registered; and
   a step of the message being sent to the device driver as it is if the number of the remote port is not a predetermined number, the message being sent to the device driver as it is after the number of the remote port is stored in an address handle structure having local port connected to the remote port if the number of the remote port is a predetermined number.

27. The multimedia contents protecting method as set forth in claim 21, wherein
   the encrypting and playing step comprises:
   a step of the data packet being sent periodically to the application program (144) along with control information, from the non-volatile storage device in the case of downloading manner, or from the information providing system in the case of streaming manner;
   a step of the data packet being hooked (403) by the filtering operation;
   a step of the number of a remote port being determined whether a predetermined number or not after my event handler is activated;
   a step of the data packet being sent to the application program (144) as it is if the number of the remote port is not a predetermined number, the data packet being sent to the application program after decryption (905) by the decryption keys if the number of the remote port is a predetermined number; and
   a step of the multimedia contents being played by repeating the above steps.

28. The multimedia contents protecting method as set forth in claim 27, further comprising:
   a step of the encrypted contents being determined whether to be stored in the non-volatile storage device or not before the decryption (905); and
   a step of the encrypted contents being decrypted (905) as it is if the choice is no storing in the non-volatile storage device, and the encrypted contents being decrypted (905) after being stored in the non-volatile storage device if the choice is storing in the non-volatile storage device.

29. The multimedia contents protecting method as set forth in claim 21, wherein the terminating step comprises:
   the step of a termination message of the application program (144) being monitored in every cycle wherein the contents data packet is decrypted and played; and
   the step of returning to the decrypting and playing step if the termination message is not detected, and disconnecting connection to the information providing system or the non-volatile storage device after termination of the application program (144) and deletion of the address handle if the termination message is detected.

30. A computer-readable storage medium for storing a computer-executable multimedia contents protecting method of preventing multimedia contents, which are sent to an application program running on a client system, from leaking without permission through the use of an information providing system and the client system, the information providing system and the client system each having a CPU, a volatile storage (memory), a non-volatile storage (hard disk) and an input/output device (keyboard, monitor, etc.), and being connected to each other through wired or wireless internal communication means or means for communicating with an external network, the multimedia contents protecting method comprising:
   an encrypting and uploading step of an encrypted contents package (121) converted from an original contents (111) using encryption keys being uploaded to the information providing system through the communication means;
   an initiating and connecting step of the client system being connected to the information providing system to initiate streaming or downloading service by selection of encrypted contents package (121) in the information providing system using the input device of the client system;

a decrypting and playing step of the client system making the encrypted data played through the output device by the application program (144), by a filtering operation repeating a process of hooking data packet of the encrypted contents package (121) with messages between the application program (144) on a higher layer and the device driver on a lower layer, converting the data packet to a format corresponding to decryption, decrypting the encrypted data packet using one or more decryption keys, and sending the decrypted data packet to the application program, during transferring in the case of a streaming manner, or in response to a play signal after downloading in the case of a downloading manner; and a terminating step of the client system terminating the operation of the application program (144) and the filtering operation and disconnecting connection to the information providing system in the case of a streaming manner, when a termination command of the application program (144) is detected.

* * * * *

UNITED STATES PATENT AND TRADEMARK OFFICE
CERTIFICATE OF CORRECTION

PATENT NO.        : 7,484,103 B2
APPLICATION NO.   : 10/501254
DATED             : January 27, 2009
INVENTOR(S)       : Woo et al.

It is certified that error appears in the above-identified patent and that said Letters Patent is hereby corrected as shown below:

Col. 34, Line 27-28
Claim 22 should read; --...contents package (121) to the provision means (120).--

Signed and Sealed this

Twenty-fourth Day of March, 2009

JOHN DOLL
*Acting Director of the United States Patent and Trademark Office*